(12) United States Patent
Walker

(10) Patent No.: US 9,303,778 B2
(45) Date of Patent: Apr. 5, 2016

(54) RUPTURE DISC HAVING LASER-DEFINED LINE OF WEAKNESS WITH DISC OPENING AND ANTI-FRAGMENTATION CONTROL STRUCTURES

(71) Applicant: Fike Corporation, Blue Springs, MO (US)

(72) Inventor: Joe Walker, Kansas City, MO (US)

(73) Assignee: FIKE CORPORATION, Blue Springs, MO (US)

( * ) Notice: Subject to any disclaimer, the term of this patent is extended or adjusted under 35 U.S.C. 154(b) by 434 days.

(21) Appl. No.: 13/780,729

(22) Filed: Feb. 28, 2013

(65) Prior Publication Data
US 2014/0238984 A1    Aug. 28, 2014

(51) Int. Cl.
*F16K 17/40*    (2006.01)
*F16K 17/16*    (2006.01)
*B23K 26/36*    (2014.01)

(52) U.S. Cl.
CPC .............. *F16K 17/16* (2013.01); *B23K 26/364* (2015.10); *B23K 26/367* (2013.01)

(58) Field of Classification Search
CPC . F16K 17/16; B23K 26/367; Y10T 137/1692; Y10T 137/1699; Y10T 137/1714; Y10T 137/1729; Y10T 137/1737; Y10T 137/1744; Y10T 137/1759
USPC .......... 137/68.19, 68.21, 68.23, 68.25, 68.26, 137/68.27, 68.29; 220/89.2
See application file for complete search history.

(56) References Cited

U.S. PATENT DOCUMENTS

| | | | | |
|---|---|---|---|---|
| 3,072,288 | A * | 1/1963 | Lemmer | 220/89.2 |
| 3,109,554 | A * | 11/1963 | Porter et al. | 220/89.2 |
| 3,484,817 | A * | 12/1969 | Wood | 220/89.2 |
| 3,612,345 | A * | 10/1971 | Fike, Jr. | 220/89.2 |
| 3,709,239 | A * | 1/1973 | Morck, Jr. | 137/68.27 |
| 3,834,580 | A * | 9/1974 | Ludwig et al. | 220/89.2 |
| 3,921,556 | A * | 11/1975 | Wood et al. | 29/890.141 |
| 4,481,850 | A * | 11/1984 | Allen | 83/879 |
| 4,512,171 | A * | 4/1985 | Mozley | 72/55 |
| 4,669,626 | A * | 6/1987 | Mozley | 220/89.2 |
| 5,167,337 | A | 12/1992 | Short, III et al. | |
| 5,267,666 | A * | 12/1993 | Hinrichs et al. | 220/89.2 |
| 5,368,180 | A * | 11/1994 | Farwell et al. | 220/89.2 |
| 5,377,716 | A * | 1/1995 | Farwell et al. | 137/68.27 |
| 5,558,114 | A | 9/1996 | Strelow | |
| 6,178,983 | B1 * | 1/2001 | Culliinane et al. | 137/68.26 |
| 6,792,964 | B2 * | 9/2004 | Farwell et al. | 137/68.25 |

(Continued)

OTHER PUBLICATIONS

International Search Report and Written Opinion dated May 21, 2014, in the corresponding PCT/US2014/016058 filed Feb. 12, 2014.

*Primary Examiner* — Craig Schneider
*Assistant Examiner* — Minh Le
(74) *Attorney, Agent, or Firm* — Hovey Williams LLP

(57) ABSTRACT

A rupture disc (10) is provided comprising a line of opening (16) formed in at least one face thereof. The line of opening (16) is formed by laser machining of the disc's face and includes at least one disc opening control feature (20). The disc opening control feature (20) may be an opening-initiation feature configured to assist with initial rupture of the disc (10). Alternatively, the opening control feature (20) may be an anti-fragmentation feature configured to dissipate the energy acting upon the disc (10) so as to prevent separation of the petal formed upon opening of the disc.

37 Claims, 23 Drawing Sheets

(56) References Cited

U.S. PATENT DOCUMENTS

| | | |
|---|---|---|
| 7,017,767 B2* | 3/2006 | Eijkelenberg et al. ....... 220/89.2 |
| 8,333,212 B2* | 12/2012 | Shaw et al. ................ 137/15.18 |
| 2005/0103786 A1* | 5/2005 | Eijkelenberg et al. ....... 220/89.2 |
| 2006/0237457 A1* | 10/2006 | Shaw et al. ................. 220/89.2 |
| 2010/0140238 A1* | 6/2010 | Mozley et al. ........... 219/121.72 |
| 2010/0140264 A1 | 6/2010 | Hernandez |
| 2010/0224603 A1* | 9/2010 | Modena et al. .......... 219/121.72 |
| 2010/0258200 A1* | 10/2010 | Walker et al. .............. 137/68.25 |
| 2012/0000548 A1* | 1/2012 | Khamitkar ................. 137/68.25 |
| 2013/0056085 A1* | 3/2013 | Tomasko et al. ................ 137/14 |
| 2014/0021203 A1* | 1/2014 | Walker et al. ................ 220/89.2 |

\* cited by examiner

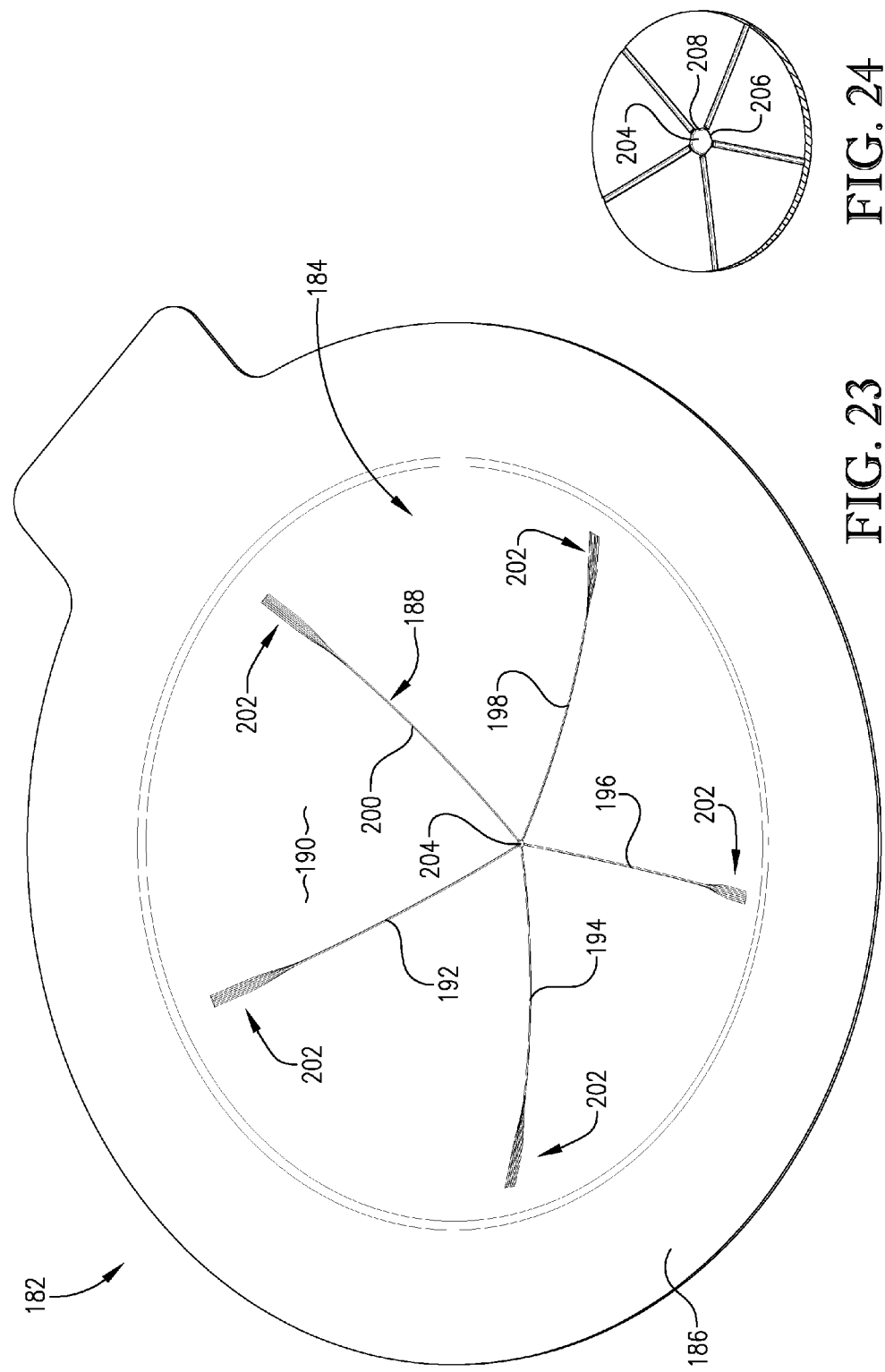

RUPTURE DISC HAVING LASER-DEFINED LINE OF WEAKNESS WITH DISC OPENING AND ANTI-FRAGMENTATION CONTROL STRUCTURES

BACKGROUND OF THE INVENTION

1. Field of the Invention

The present invention is generally directed toward rupture discs having a laser-formed line of opening comprising one or more disc opening control structures. The disc opening control structures may comprise anti-fragmentation features or opening-initiation features. These structures provide for greater control over the opening characteristics of the disc. Particularly, the opening-initiation features provide increased control over the portion of the rupture disc where initial rupture is to occur, and the anti-fragmentation features can be utilized to reduce the likelihood of separation of the petal formed upon opening of the disc.

2. Description of the Prior Art

Lines of opening, also sometimes referred to as score lines, have been used for some time in rupture discs to define an area of the disc that opens upon exposure to a predetermined overpressure condition. During opening, the rupture disc tears at the line of opening to create one or more petals that pivot about one or more respective hinge regions under the force of the overpressure condition to permit a pressurized fluid to flow through the opened disc.

Score lines are typically created through the use of metal scoring dies. When using a metal scoring die to form the score line, the die compresses and work hardens the disc metal, thus changing the grain structure of the metal. This work hardening can increase the brittleness of the metal and create stress zones. The brittleness and stress zones limit the service life of the pressure relief device as a result of fatigue cracking and stress corrosion. Additionally, it is difficult to achieve a high degree of control over the depth of the score in disc manufacturing, given that the die itself becomes worn during the scoring process and must be periodically replaced. This lack of control imparts a degree of unpredictability into the disc opening characteristics.

In order to avoid the issues with die scoring, alternate processes have been devised to form lines about which the rupture disc opens. One such process is described in U.S. Pat. No. 7,600,527, which discloses forming a line of weakness through an electropolishing method. In this process, a rupture disc is provided with a layer of resist material. A laser is then used to remove a portion of the resist material corresponding to the desired line of weakness. Next, the disc undergoes an electropolishing operation to remove metal from the surface of the disc thereby forming a line of weakness having a desired depth. However, controlling the width of the electropolished line of weakness can be difficult, particularly if the disc material is relatively thick and requires extended electropolishing times in order to achieve the desired line depth. This characteristic can limit the ability to use this method in forming more complex structures comprising multiple trenches in close proximity to each other.

It has also been suggested to directly use a laser to machine a line of weakness into a rupture disc. U.S. Patent Application Publications 2010/0140264 and 2010/0224603 are exemplary in this regard. However, these references adopt conventional line of weakness configurations insofar as the lines of weakness comprise relatively long, continuous trenches formed in one face of the disc which can limit the range of burst pressures that can be created for a disc of a particular thickness.

SUMMARY OF THE INVENTION

The present invention overcomes a number of the aforementioned shortcomings and provides for the creation of lines of opening comprising disc opening control features aimed at enhancing control over the opening characteristics of a pressure relief device, such as a rupture disc. According to one embodiment of the present invention there is provided an over-pressure relief device comprising a rupture disc. The rupture disc includes a central section having opposed faces, and an outer flange section in surrounding relationship to the central section. A lased line of opening is formed in the rupture disc, and particularly the central section in some embodiments, which defines, at least in part, an over-pressure relief area. The lased line of opening includes one or more line-of-opening segments and one or more lased opening control features. The one or more line-of-opening segments comprise a channel penetrating into the disc from one of the faces toward the other face. The one or more opening control features are defined at least in part by a pair of lased side margins. These lased side margins converge toward each other in the direction of at least one of the line-of-opening segments.

According to another embodiment of the present invention there is provided a method of forming a line of opening in a pressure relief device. A pressure relief device is provided comprising a central section having opposed faces and an outer flange section in surrounding relationship to the central section. The line of opening is formed in the central section by passing a laser beam over the central section in a plurality of laser passes. Each of the passes follows a predetermined laser path, and each of the passes is operable to selectively remove material from the central section by laser ablation thereby forming a trench. The line of opening formed comprises one or more line-of-opening segments and one or more opening control features. At least a portion of each of the plurality of laser paths is spaced from at least a portion of at least one other laser path such that the trench produced by laser ablation on each path is at least partially or wholly superposed on the trench produced by laser ablation on the other laser path. The portions where the plurality of laser paths maintains a substantially constant separation and degree of trench superposition correspond with the one or more line-of-opening segments. At least a portion of at least one laser path diverges from one or more other laser path(s). The diverging portions of the laser paths correspond with the one or more opening control features.

BRIEF DESCRIPTION OF THE FIGURES

FIG. 23 is an isometric view of another rupture disc embodiment having a 5-petal line of opening configuration with anti-fragmentation features disposed at the end regions of the line-of-opening segments;

FIG. 24 is a close-up fragmentary view of a polygonal recessed area located at the apex of the disc's bulged section.

DETAILED DESCRIPTION OF THE PREFERRED EMBODIMENT

The following detailed description references various exemplary embodiments of the present invention. The embodiments are intended to describe aspects of the invention in sufficient detail to enable those skilled in the art to practice the invention. Other embodiments can be utilized and changes can be made without departing from the scope of the present invention. Thus, the following detailed description is not to be taken in a limiting sense.

The present invention is concerned generally with pressure relief devices, particularly rupture discs, comprising laser-machined lines of opening including at least one type of disc opening control feature. The disc opening control feature may serve to assist with disc opening initiation or to prevent fragmentation of a petal formed upon opening of the disc.

Figure 1:
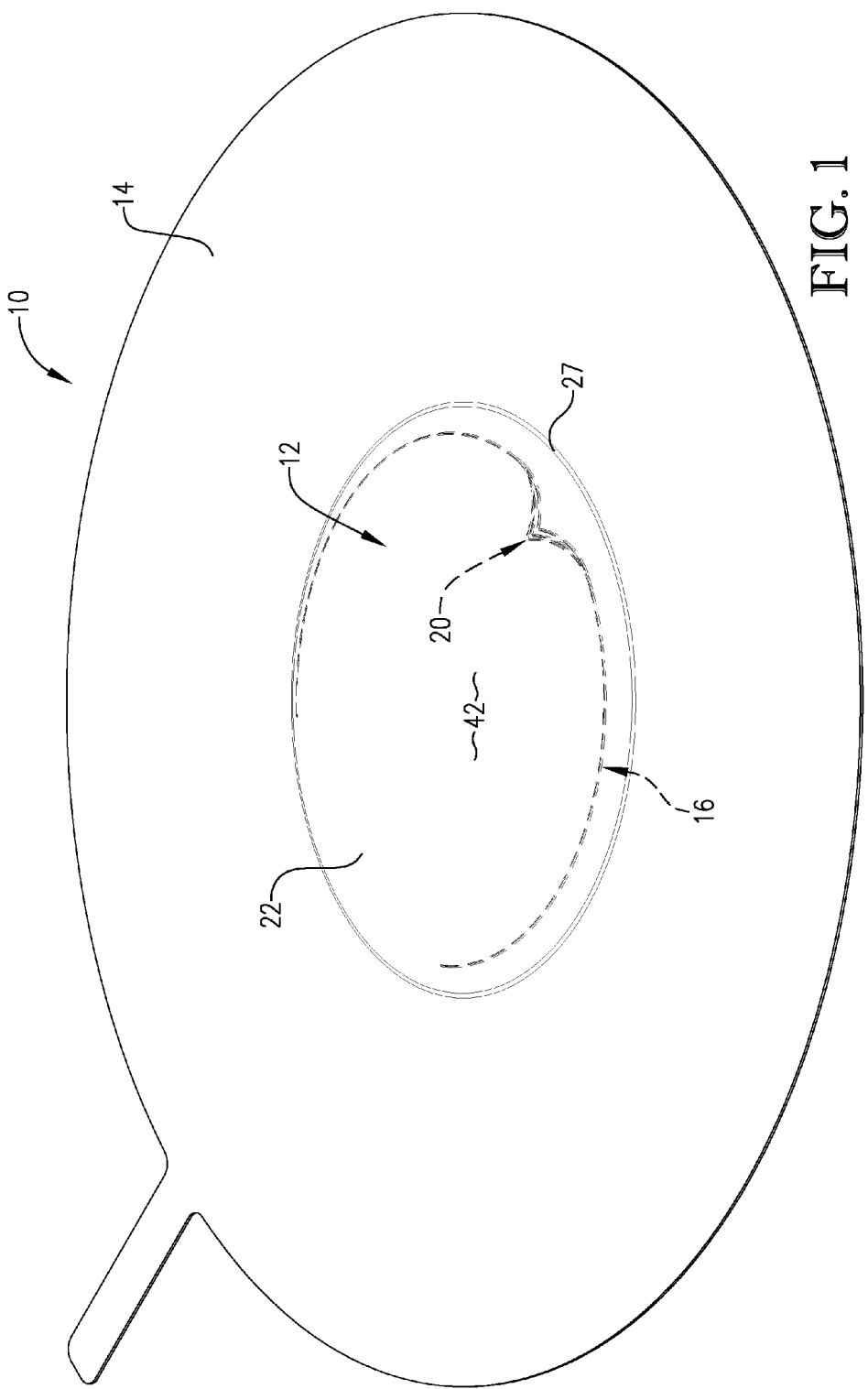
FIG. 1 is an isometric view of the convex face of a reverse-acting rupture disc having a laser-machined line of opening comprising a lased opening control feature.

Turning now to the drawings, and in particular FIG. 1, a reverse-acting rupture disc 10 having a central bulged section 12 surrounded by an outer flange section 14. It is understood, though, that disc 10 may be any type of rupture disc, include a bulged forward acting rupture disc or a flat or un-bulged rupture disc. Disc 10 can be comprised of any material including various metals such as stainless steels, Hastalloy, Inconel, titanium, and nickel. A line of opening 16 is formed in the bulged section 12 using laser-machining methods. One of skill in the art is capable of selecting an appropriate laser and laser operating parameters depending upon numerous variables such as the disc material, disc thickness, and desired processing time. In certain embodiments, it is desirable to select a laser and laser operating parameters so as to avoid creation of heat affected zones within bulged section 12 as this can lead to unpredictable disc reversal and opening characteristics. Thus, the grain structure of the metal within and adjacent to the lased line of opening 16 is substantially the same as the remainder of bulged section 12.

Figure 2:
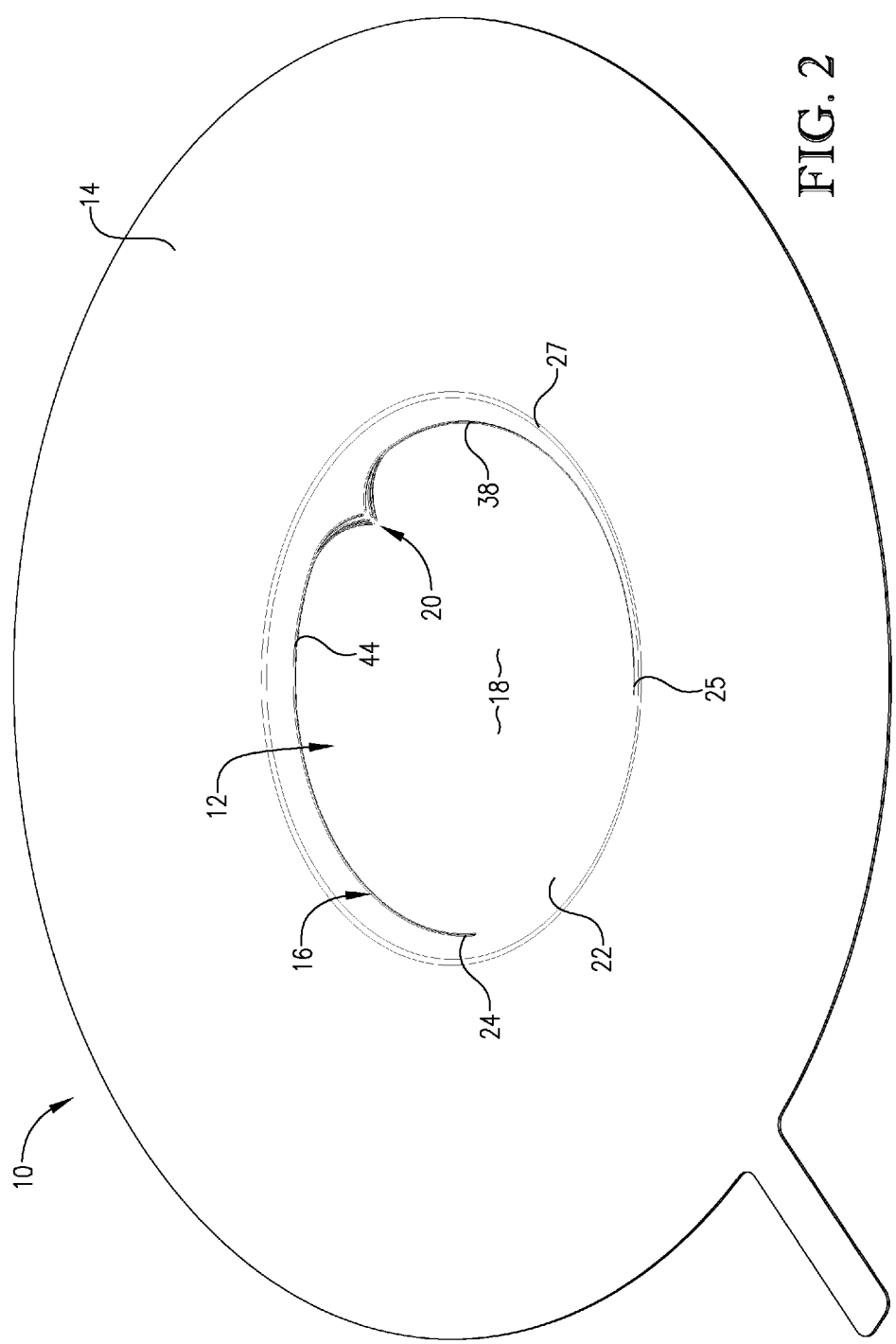
FIG. 2 is an isometric view of the convex face of the reverse-acting rupture disc of FIG. 1.
Figure 3:
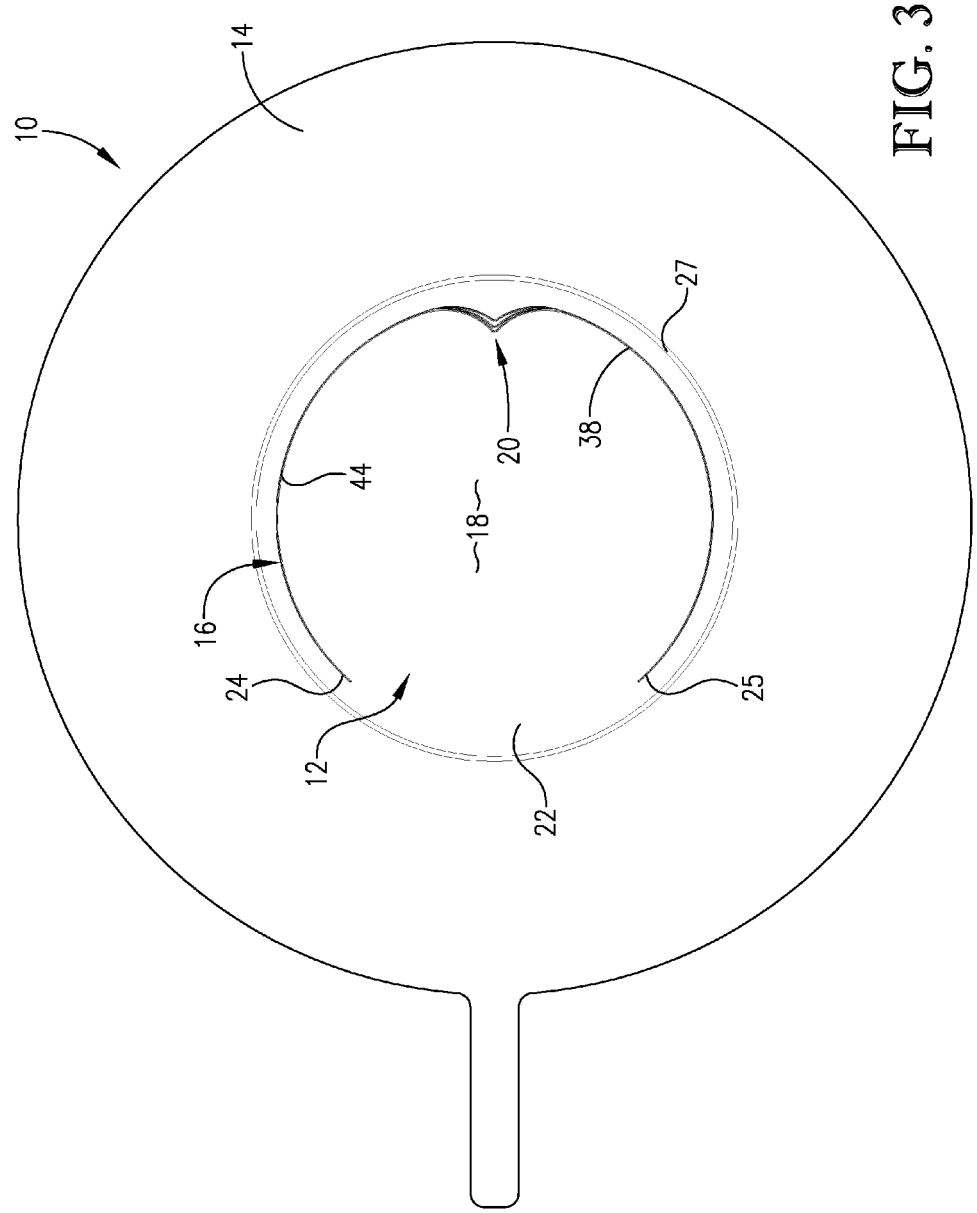
FIG. 3 is a plan view of the convex face of the reverse acting rupture disc of FIG. 1.

As shown in FIGS. 2 and 3, line of opening 16 is substantially C-shaped and formed in the concave surface 18 of bulged section 12. It is understood, however, that other embodiments of the present invention may include other patterns for line of opening 16. Such alternate patterns include cross-patterns (see, FIG. 13), and discontinuous or "dashed" lines of open including configurations described in U.S. Patent Application No. 61/720,800, filed Oct. 31, 2012, incorporated by reference herein in its entirety. Line of opening 16 serves to define, at least in part, an overpressure relief area that, upon opening of rupture disc 10, permits the flow of pressurized fluid through the disc. Line of opening 16 includes a lased opening control feature 20 located opposite from a hinge region 22 defined by spaced-apart terminal end regions 24, 25. Upon opening of disc 10, the resulting petal formed by the tearing of bulged section 12 at line of opening 16 pivots about hinge region 22 to permit relief of an overpressure condition. Disc 10 includes a transition region 27 that interconnects bulged section 12 and outer flange section 14. In certain embodiments, and particularly those shown in the Figures, line of opening 16 is located inboard of transition region 27. However, it is within the scope of the present invention for line of opening 16 to be formed in whole or in part on any portion of the disc 10, including on and/or across transition region 27 and outer flange section 14. The exact location of line of opening 16 can be varied depending upon the particular application for disc 10.

In the embodiment illustrated in FIGS. 1-5, opening control feature 20 comprises an opening-initiation feature that is configured to assist with opening of bulged section 12 upon exposure to an overpressure condition. As explained in greater detail below, opening control feature 20 is particularly suited to use in conjunction with apparatus configured to initiate tearing of the disc material upon reversal of bulged section 12, such as a support ring having a disc-engaging tooth, although this need not always be the case. As clearly shown in FIGS. 4 and 5, opening control feature 20 comprises a plurality of spaced-apart lased trenches 26-36. Trenches 26, 28, 30 converge towards each other (in the direction toward end region 25) and eventually merge into a line-of-opening segment 38. Trenches 26 and 30 comprise margins 29, 31, respectively, that define in part opening control feature 20. Likewise, trenches 32 and 36 comprise margins 33, 35, respectively, that define in part opening control feature 20. Segment 38 comprises a single channel 40 that extends from concave surface 18 toward convex surface 42. Likewise, trenches 32, 34, 36 converge towards each other (in the direction toward end region 24) into a line-of-opening segment 44. Segment 44 also comprises a single channel 46 similar to channel 40.

Figure 4:
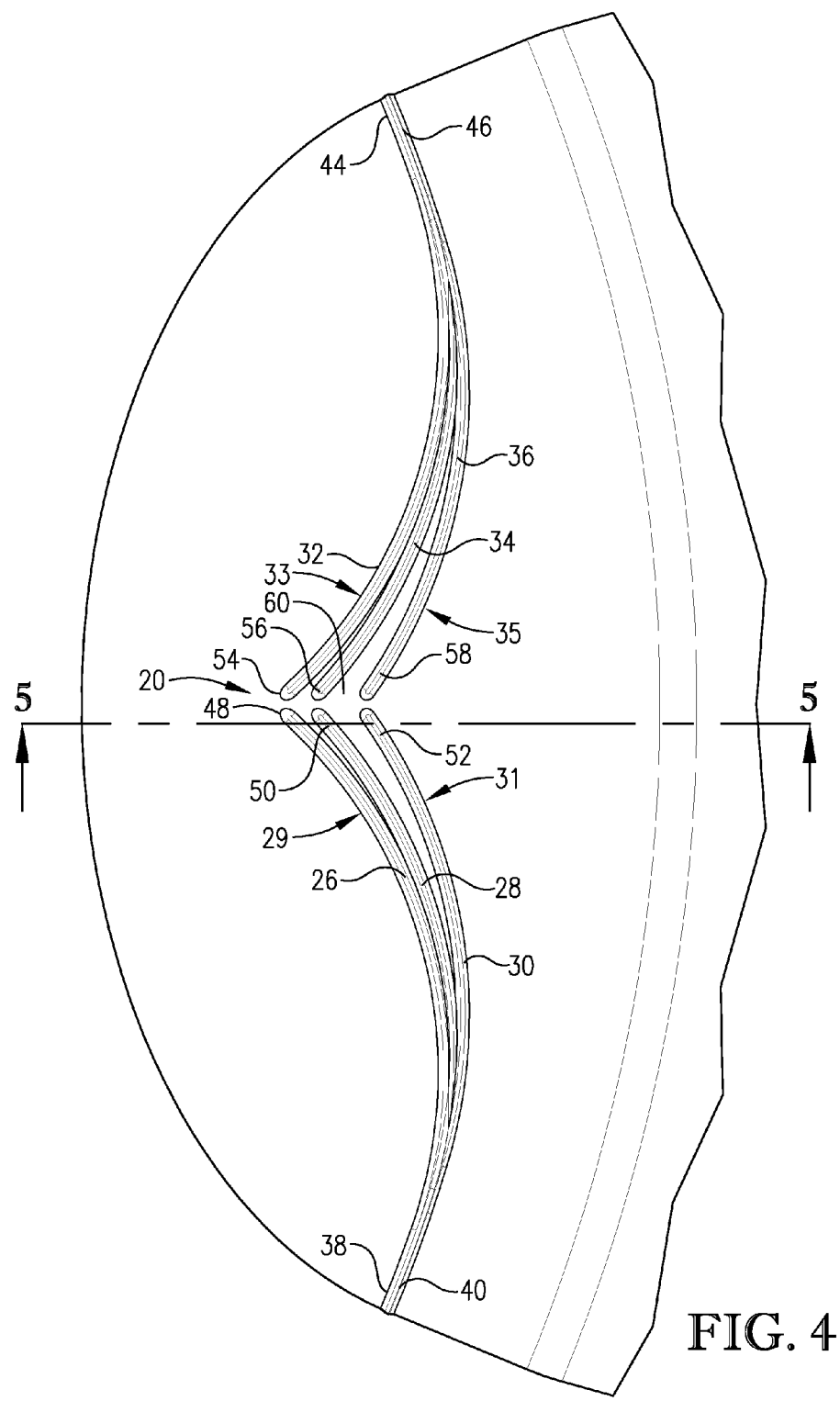
FIG. 4 is a close-up, fragmentary view of the lased opening control feature of the rupture disc of FIG. 1.
Figure 5:
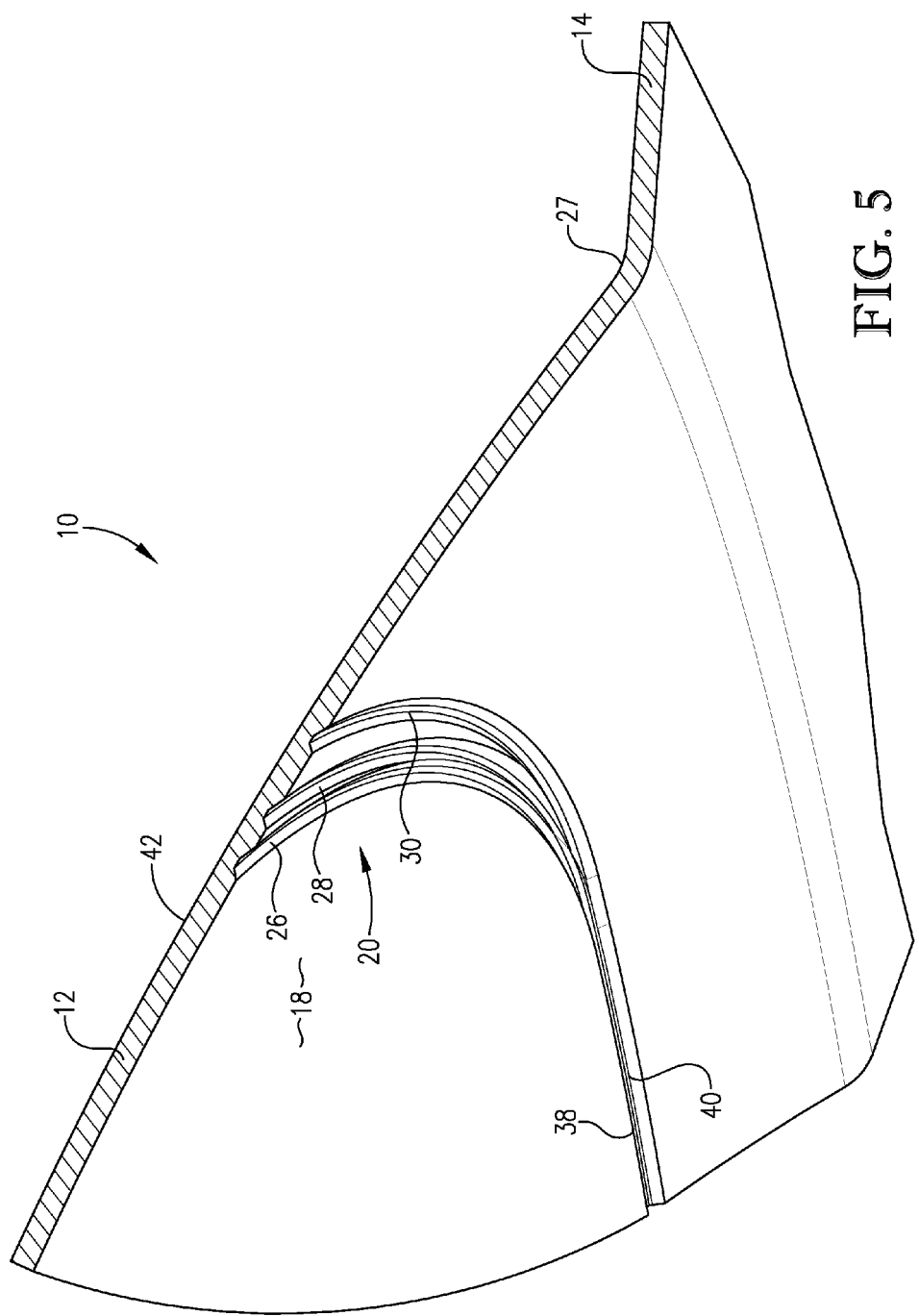
FIG. 5 is a fragmentary, sectioned view of the bulged section of the rupture disc of FIG. 4 taken along line 5-5.

In the embodiment shown in FIG. 4, the trenches comprising opening control feature 20 are discontinuous, with each trench presenting a respective end section 48-58. Each end section is separated from another respective end section by an un-lased region 60. For example, end section 48 is located directly opposite end section 54, with the two end sections separated by un-lased region 60. The same is true for end section pairs 50, 56 and 52, 58.

Figure 6:
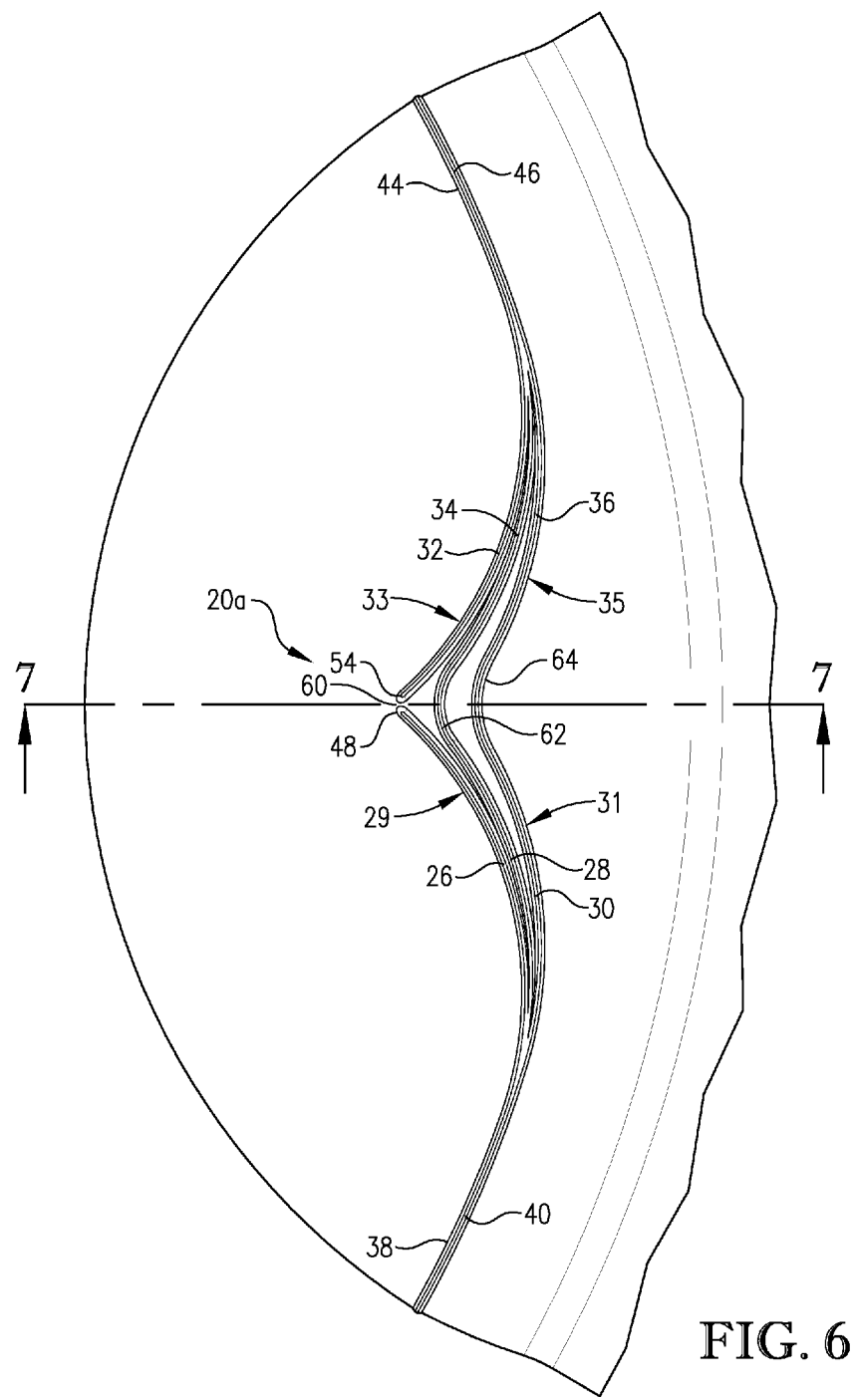
FIG. 6 a close-up, fragmentary view of an alternate embodiment of a lased opening control feature.
Figure 7:
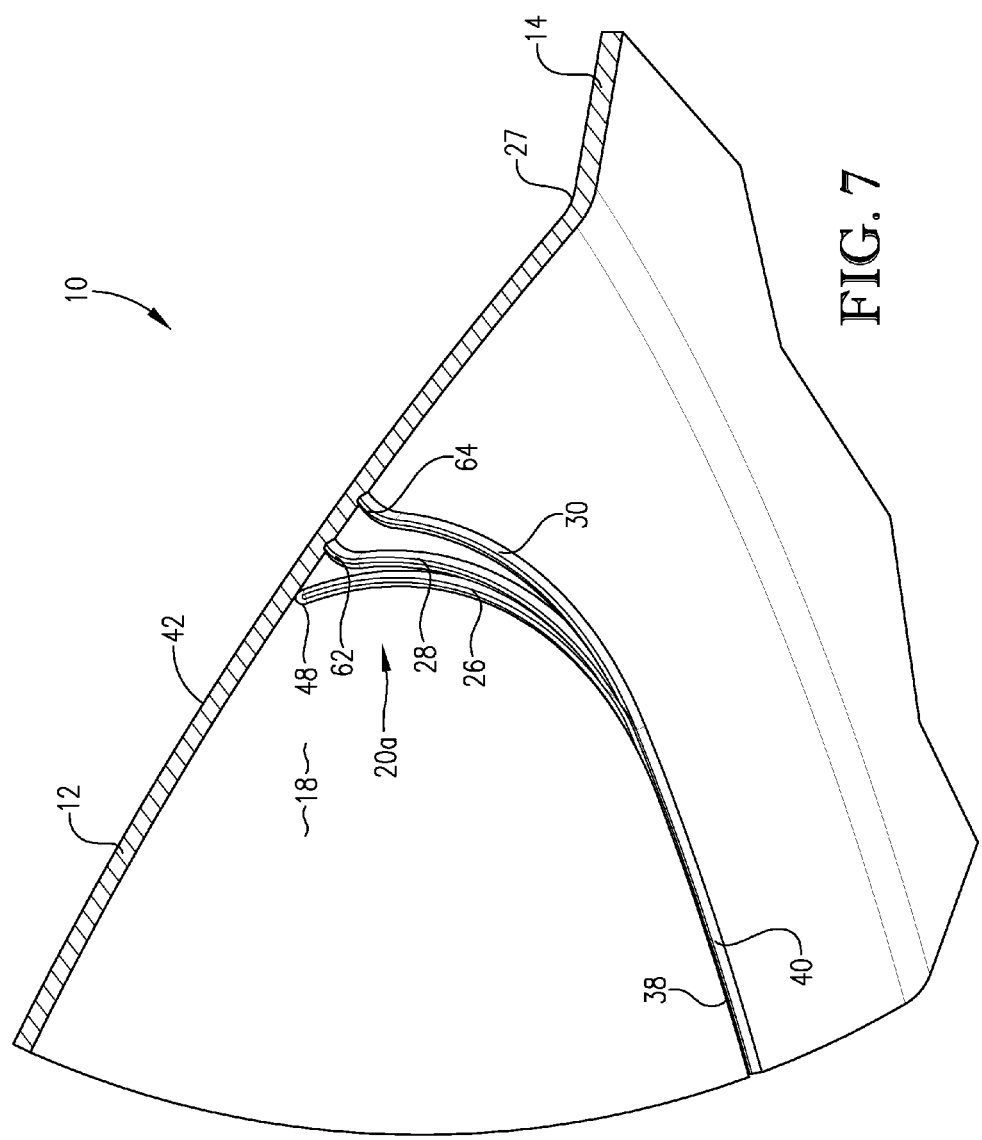
FIG. 7 is a fragmentary, sectioned view of the bulged section of the rupture disc of FIG. 6 taken along line 7-7.

FIGS. 6 and 7 depict an opening control feature 20a having a slightly modified configuration. Trenches 48 and 54 appear substantially the same as in the embodiment of FIG. 4. However, the remaining trench pairs 28, 34 and 30, 36 are interconnected by respective bight sections 62, 64. Bight sections 62, 64 have a curvature that extends in the direction of the center of bulged section 12, generally opposite of the curvature of line-of-opening segments 38, 44.

Figure 8:
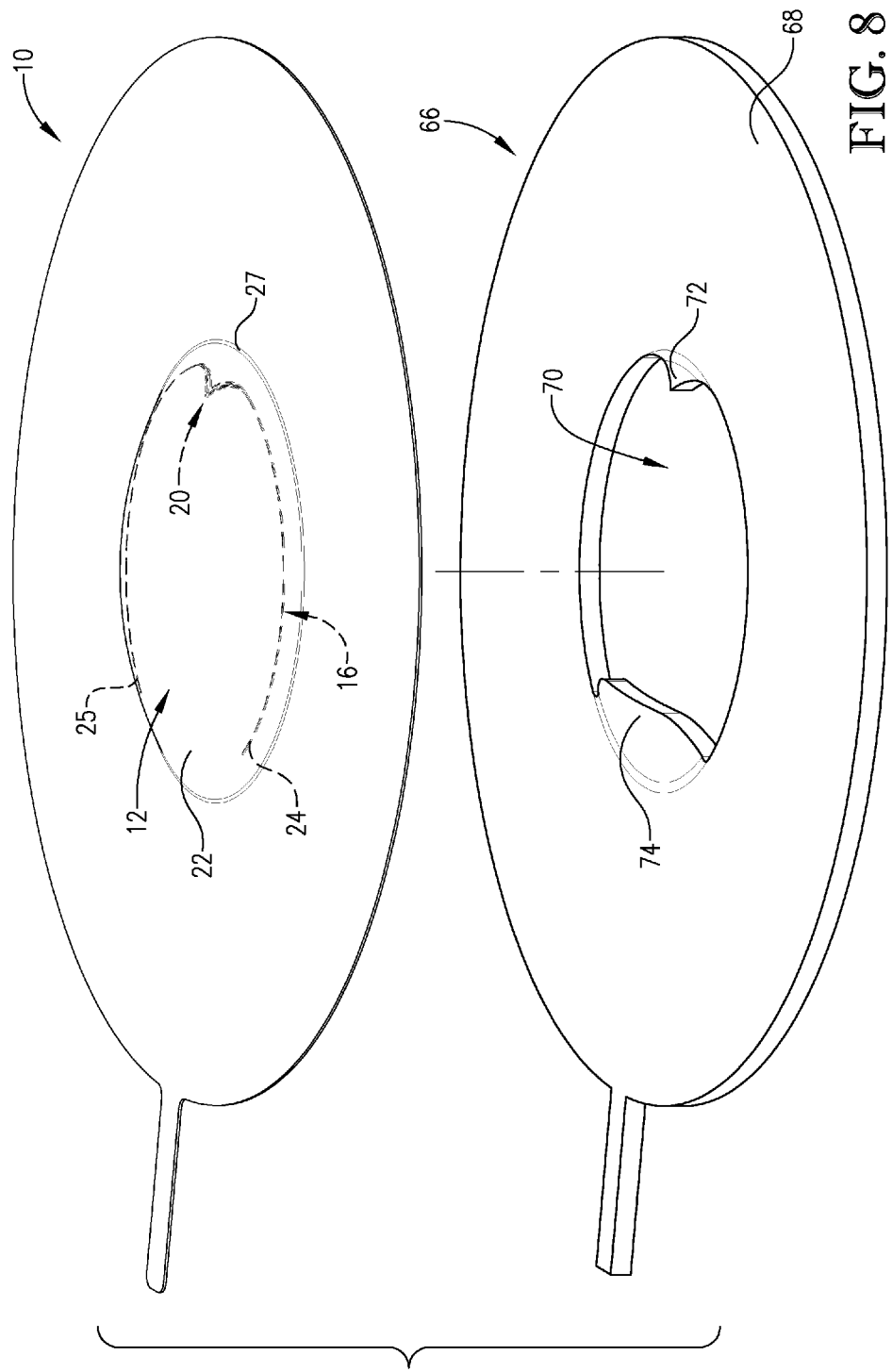
FIG. 8 is an expanded isometric view of the rupture disc of FIG. 1 and an exemplary rupture disc support ring having a disc-opening tooth configured to engage the opening-initiation feature of the line of opening.

In certain embodiments, rupture disc 10 is configured for use with a support ring 66 as depicted in FIG. 8. Support ring 66 comprises an annular body 68 having a central orifice 70. Body 68 further includes a tooth 72 and a hinge support 74, both of which generally project inwardly toward orifice 70. Tooth 72 is configured to engage opening control feature 20 upon reversal of bulged section 12 following exposure to an overpressure condition. Particularly, tooth 72 is configured to contact bulged section 12 at or in the immediate vicinity of one or more of trenches 26-36. As reversal progression of bulged section 12 can be difficult to predict or precisely control for a particular overpressure event, with conventional single-trench lines of opening, tooth 72 cannot always be assured of making initial contact with bulged section 12 at the line of opening. Opening control feature 20 alleviates this concern by expanding the area in which tooth 72 may initially engage bulged section 12 during disc reversal. Thus, tooth 72 can be assured of contacting bulged section 12 at a point that is likely to result in tearing of the disc. Once tearing of the bulged section is initiated at opening control feature 20, tearing progresses along line-of-opening segments 38, 44 toward end regions 24, 25. The petal formed by the tearing of bulged section 12 pivots about hinge region 22, which is in contact with hinge support 74 so as to prevent fragmentation of the petal.

Figure 9:
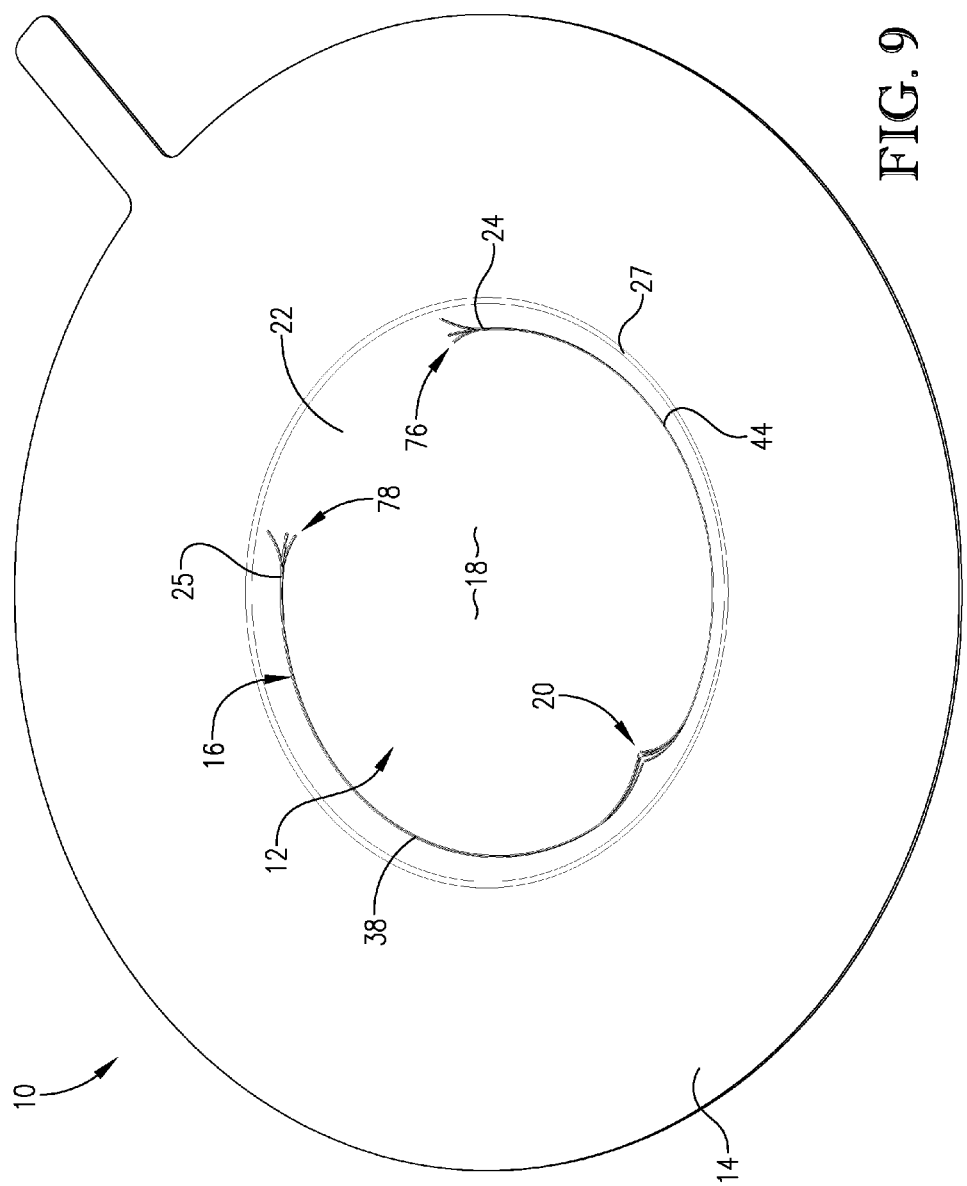
FIG. 9 is an isometric view of the concave face of a rupture disc having a substantially C-shaped line of opening comprising an opening-initiation feature and a pair an anti-fragmentation features formed in the end regions of the line of opening.
Figure 10:
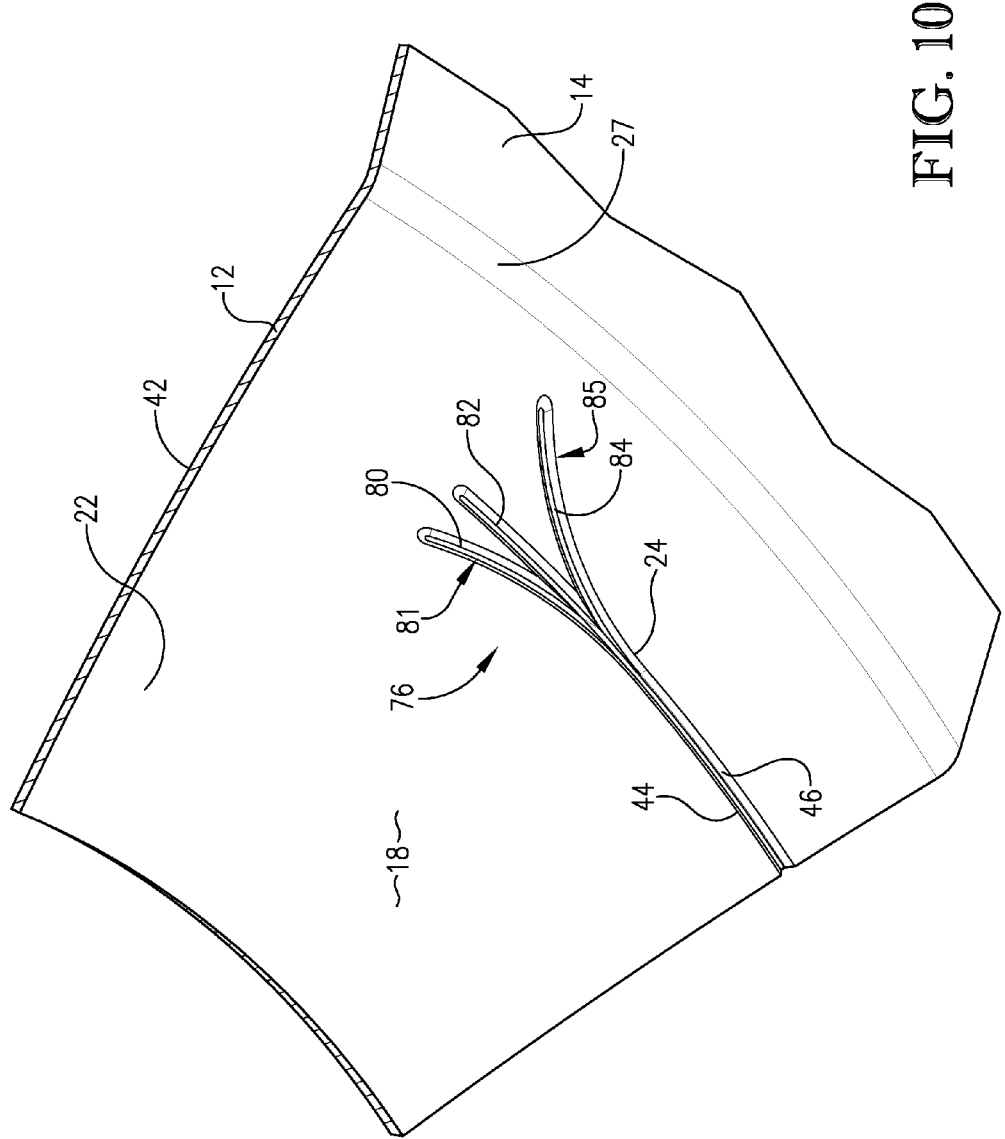
FIG. 10 is a close-up, sectioned view of the rupture disc of FIG. 9, and particularly the anti-fragmentation feature.

FIGS. 9 and 10 illustrate an alternate embodiment of a rupture disc made in accordance with the present invention. This alternate embodiment is similar in many respects to the rupture disc of FIG. 1. Accordingly, the same reference numerals are used to identify these similar structures. Turning now to FIG. 9, disc 10 is a reverse-acting rupture disc comprising a line of opening 16 formed in concave face 18 of bulged section 12. Line of opening 16 comprises an opening control feature 20, which functions as an opening-initiation feature, line-of-openings segments 38, 44, which extend from opening control feature 20 toward end regions 25, 24, respectively. End regions 24, 25 each comprise an additional disc opening control feature 76, 78. Opening control features 76, 78 function as anti-fragmentation features that serve to diffuse the tearing forces acting upon line of opening 16 during opening of disc 10 thereby preventing tearing of the disc material across hinge section 22 and avoiding fragmentation of the disc petal.

As shown in FIG. 10, opening control feature 76 comprises a plurality of spaced-apart trenches 80, 82, 84 that extend from channel 46 of line-of-opening segment 44 in a direction toward hinge section 22. Trenches 80, 82, 84 also extend from channel 46 in generally different directions, although this need not always be the case. For example, trench 80 extends from channel 46 in a direction that is inboard of line of opening 16, trench 82 along substantially the same path of travel as line-of-opening segment 44, and trench 84 in a direction that is toward flange section 14. Trenches 80 and 84 also comprise respective margins 81, 85 that serve to define in part opening control feature 76.

Figure 11:
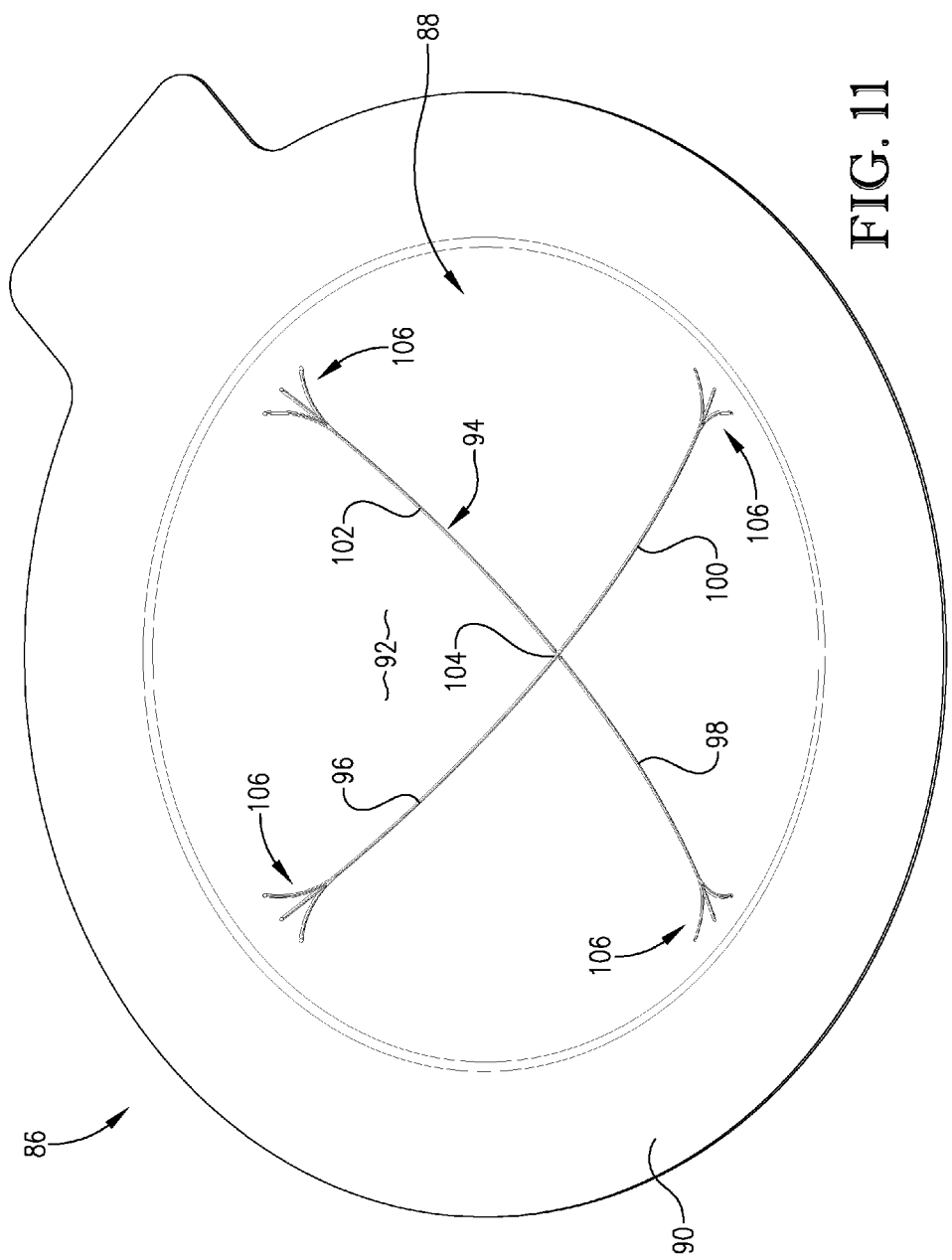
FIG. 11 is an isometric view of another embodiment of rupture disc having a cross-patterned line of opening with anti-fragmentation features disposed at the end regions of the line-of-opening segments proximate the flange section.

FIG. 11 illustrates yet another embodiment of the present invention in which the disc opening control features are utilized as anti-fragmentation features. Rupture disc 86 is configured as a forward-acting disc comprising a central bulged section 88 surrounded by an outer flange section 90. Formed in the concave face 92 of bulged section 88 is a line of opening 94 having a cross-pattern configuration. It is understood, though, that line of opening 94 may also be formed in the convex face of bulged section 88. Line of opening 94 generally comprises four line-of-opening segments 96, 98, 100, 102. Segments 96 and 100 are illustrated as being contiguous, intersecting at the apex 104 of bulged section 88. Segments 98 and 102 are illustrated as approaching apex 106, but not intersecting with each other or with segments 96, 100. This configuration prevents the laser from being doubly passed over apex 104 resulting in the removal of more disc material than desired, and quite possibly formation of a pinhole through the disc. Each line-of-opening segment comprises an opening control feature 106 disposed at a respective end region thereof adjacent to outer flange section 90. In this embodiment, opening control features 106 are utilized as anti-fragmentation features. It is recognized that other line of opening configurations comprising one or more opening control features as described herein are within the scope of the present invention and that the foregoing embodiments are merely exemplary. For example, forward-opening or reverse-opening discs with lines of opening resulting in two, three, or five or more petals are amenable to the improvements shown here.

Figure 12:
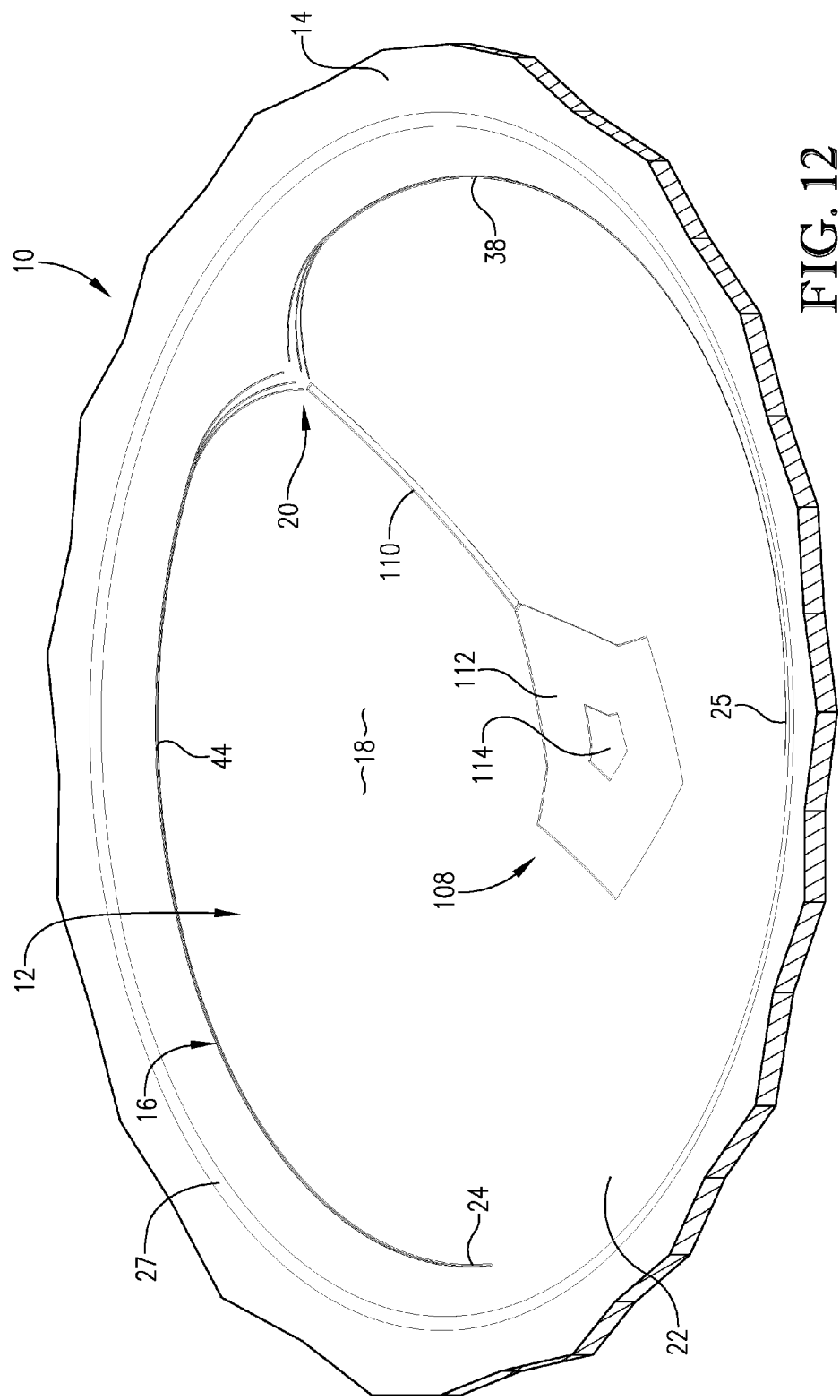
FIG. 12 is a fragmentary isometric view of the concave face of another embodiment of a reverse-acting rupture disc comprising a reversal initiation feature along with a lased line of opening similar to that shown in FIG. 1.
Figure 13:
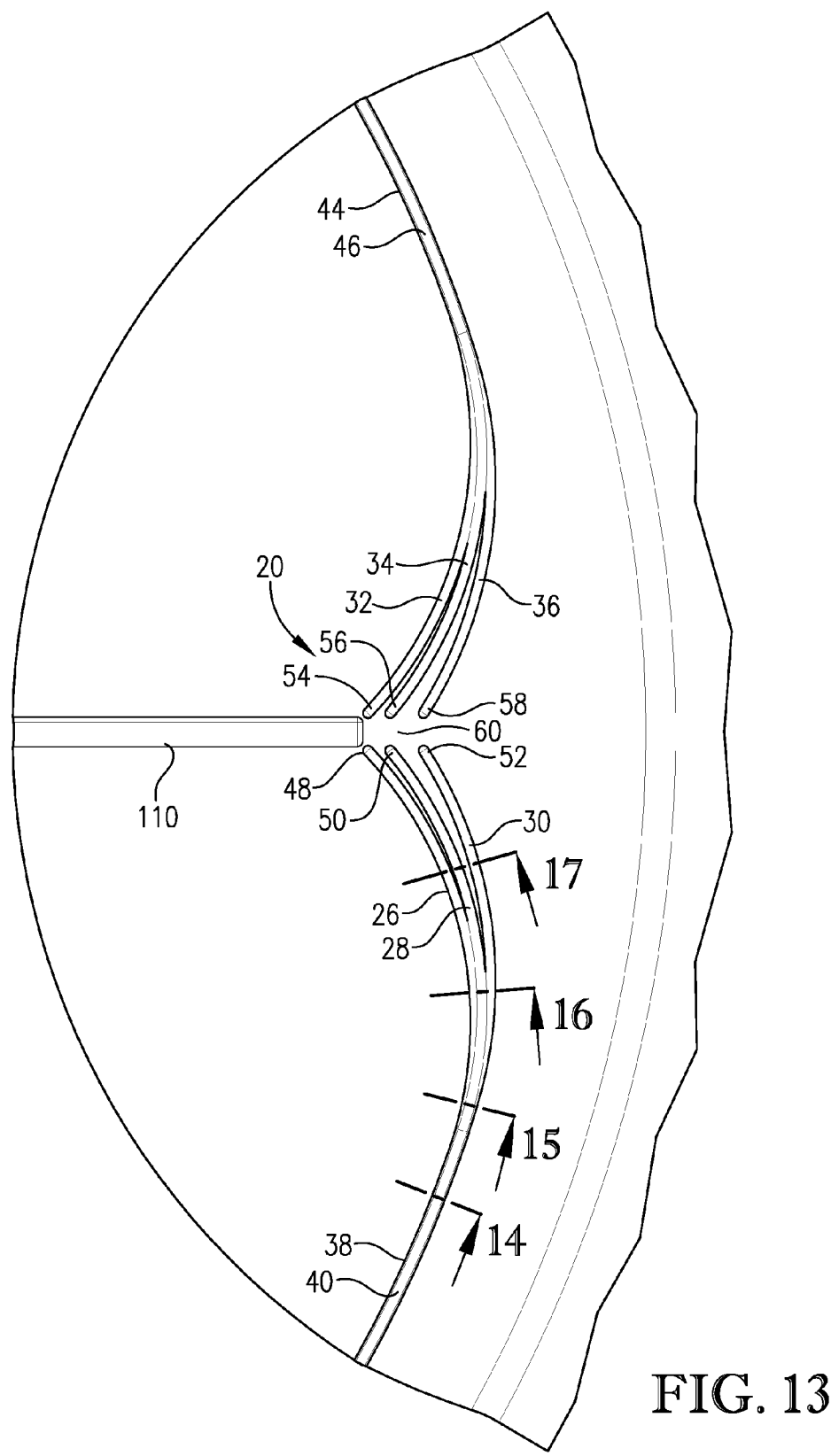
FIG. 13 is a close-up fragmentary view the rupture disc of FIG. 12 and particularly of the opening-initiation feature of FIG. 12.

FIGS. 12 and 13 illustrate a further embodiment of the present invention in which the rupture disc 10 further comprises a reversal initiation feature 108 and a line of weakness 110, such as those disclosed in U.S. patent application Ser. No. 13/552,165, filed Jul. 18, 2012, and incorporated herein by reference in its entirety. Reversal initiation feature 108 generally comprises a first lased area 112 that is recessed from and has a reduced thickness as compared to the rest of bulged section 12 surrounding the lased area, and a second lased area 114 located within the margins of first lased area 112. Lased area 114 generally has a reduced thickness as compared to lased area 112 and provides an additional means of fine tuning control over the pressure at which bulged section 12 reverses than might otherwise be achieved through a reversal initiation feature having a single depth. As disclosed in the '165 application, it is possible for reversal initiation feature 108 to comprise a number of alternate configurations. Line of weakness 110 generally comprises a lased trench and assists in guiding the reversal of bulged section 12 that began within reversal initiation feature 108 toward opening control feature 20, and optionally, support ring tooth 72, to ensure that opening of bulged section 12 occurs at some point opposite from hinge region 22. As shown in FIG. 13, line of weakness 110 approaches but does not intersect with trenches 26-36.

Figure 14:
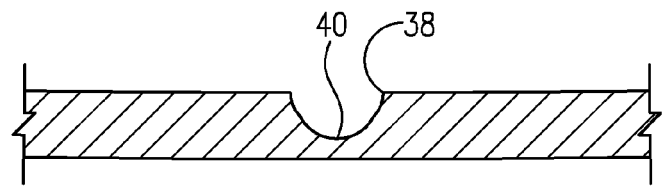
FIG. 14 is a cross-sectional view of the rupture disc of FIG. 13 taken along line 14.

FIGS. 14-17 are cross-sectional views taken along the respective section lines of FIG. 13 and schematically illustrate how line of opening 16 changes in depth with progress along opening control feature 20. FIG. 14 illustrates the line-of-opening segment 38 and channel 40 at a point just prior to the divergence of trenches 26 and 30 away from trench 28. In certain embodiments, line of opening 16 is created by passing a laser beam over bulged section 12 in a plurality of laser passes. Each laser pass follows a predetermined laser path across bulged section 12 and results in removal of disc material by ablation. Portions of the laser paths are spaced such that the trenches formed by each ablative pass are at least partially or wholly superposed. Additionally, other portions of the laser paths are spaced such that the trenches formed by each ablative pass diverge from at least one other trench. The greater the degree of superposition of the successive laser beam passes, generally the greater the depth of line of opening 16 over that area. Channel 40 generally comprises an area of laser machining in which the laser paths of two or more laser passes have been superposed to a generally constant degree.

Figure 15:
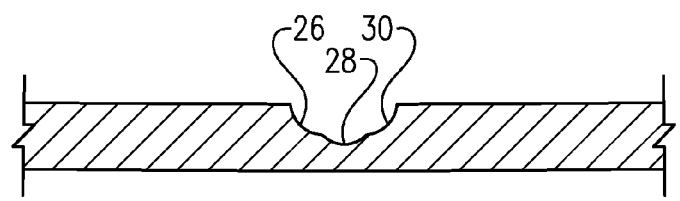
FIG. 15 is a cross-sectional view of the rupture disc of FIG. 13 taken along line 15.

As illustrated in FIG. 15, the laser paths of the successive laser passes are beginning to diverge signaling the development of individual trenches 26, 28, and 30. At this point, toward the center of the feature, larger portions of the trenches resulting from laser ablation along the beam paths continue to overlap thereby resulting in the formation of a deeper portion, corresponding with trench 28, whereas toward the margins of the feature there is less overlap, resulting in shallower portions, corresponding with trenches 26 and 30. A symmetrical section shape is by no means the only shape that might be formed by this method, as depth at any location across the feature may be controlled by the increase or decrease in trench overlap by adjusting laser paths, as well as by adjustment of other parameters available and familiar to those conversant with the operation of lasers, e.g. pulse energy, repetition rate, scan speed and spot size.

Figure 16:
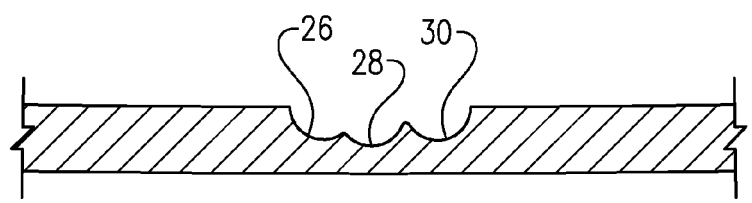
FIG. 16 is a cross-sectional view of the rupture disc of FIG. 13 taken along line 16.

FIG. 16 depicts the continued divergence of trenches 26, 28, and 30 with progress away from channel 40. While there continues to be overlap between the trenches, the degree of such overlap is less than that shown in FIG. 15. As a result, the depth at trench 28 is less than in FIG. 15 as less energy from the laser is being focused upon this area of the disc.

Figure 17:
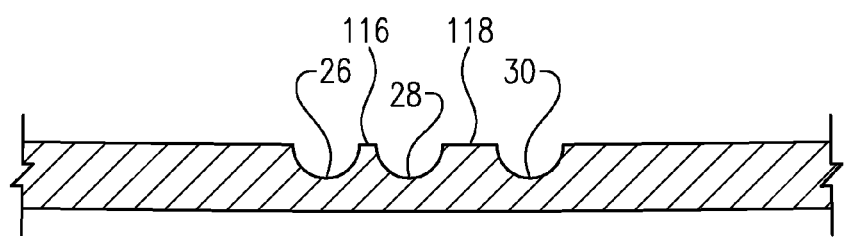
FIG. 17 is a cross-sectional view of the rupture disc of FIG. 13 taken along line 17.

FIG. 17 illustrates that the laser paths have diverged sufficiently such that trenches 26, 28, and 30 have become distinct and are separated from each other by un-lased segments 116, 118. As illustrated, trenches 26, 28, and 30 now have approximately the same depth, although this need not always be the case. It is within the scope of the present invention for trenches 26, 28, and 30 to have differing depths. But, generally, the average depth of each of trenches 26, 28, and 30 will be less than the average depth of channel 40 given the decreasing level trench superposition.

The same concepts generally hold true for opening control features 76, 78, and 106, which function as anti-fragmentation features. The average depth of each trench of these opening control features will be less than the average depth of channel 40 due to the divergence of the laser paths.

Returning to FIGS. 12 and 13, in one method of manufacture, the laser beam is operated discontinuously during the formation of opening control feature 20 thereby resulting the in the formation of un-lased region 60. For example, the laser path may be commenced at end region 24. The ablation operation continues along laser path in the portion of bulged section 12 occupied by line-of-opening segment 44. In the area of opening control feature 20, the laser path may be directed over the portion of bulged section 12 occupied by trench 32. Upon reaching end section 54, the laser beam may be interrupted (e.g., using a shutter) so that it does not impinge upon the surface of disc 10 while the laser machine adjusts its focal spot to target end section 48, at which point the laser is permitted to impinge upon the surface of disc 10 once again. The laser beam is then continuously operated along the laser path corresponding with trench 26 and line-of-opening segment 38 until end region 25 is reached. In other embodiments, the laser may be programmed to machine a single contiguous lased area (e.g., segment 38, trenches 26-30), the beam interrupted, the focal point repositioned, and the beam once again permitted to impinge upon disc 10 to machine another single contiguous lased area (e.g., segment 44, trenches 32-36).

Figure 18:
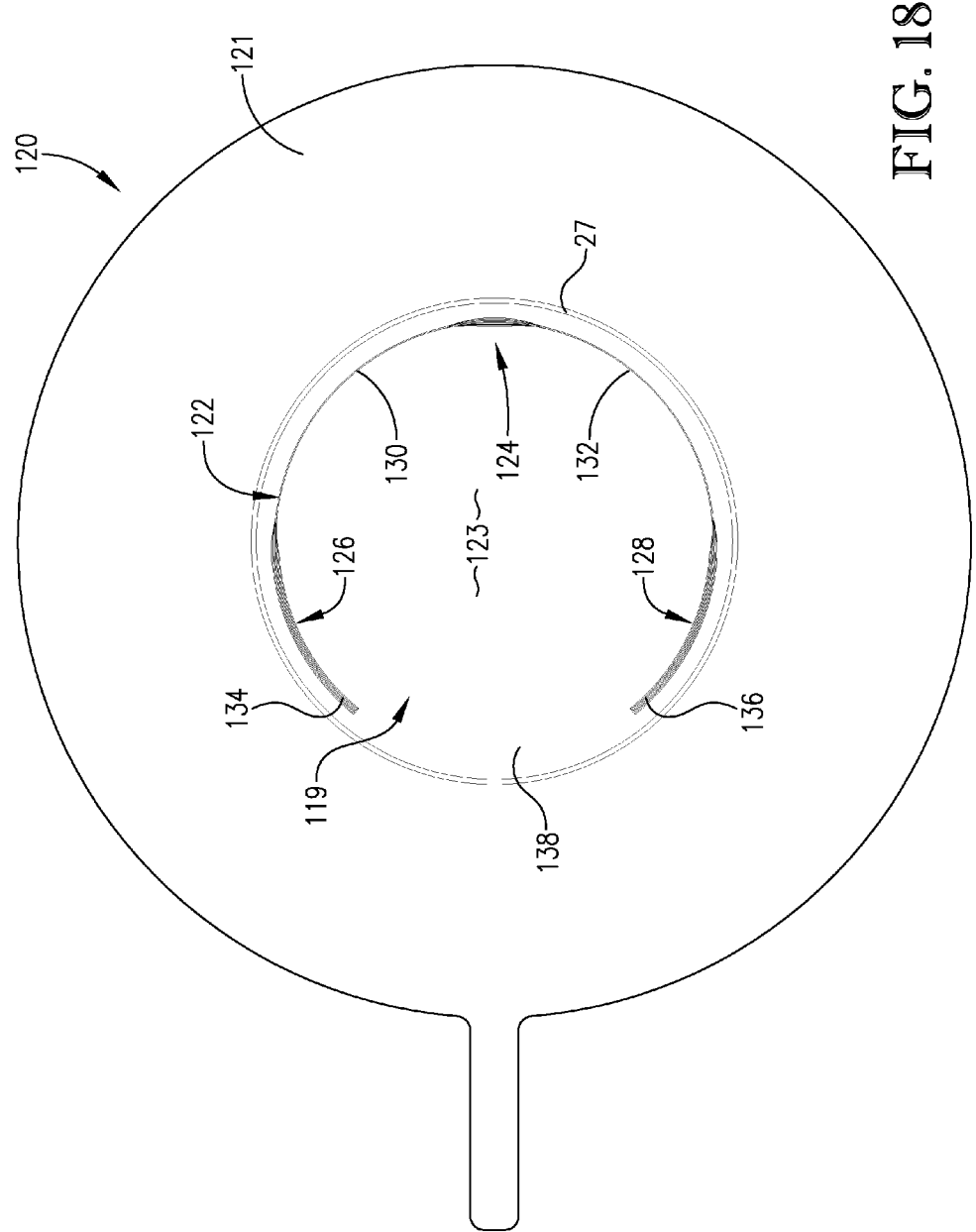
FIG. 18 is a plan view of the convex face of a rupture disc according to an alternate embodiment of the present invention.

FIG. 18 depicts a bulged rupture disc 120 having a bulged section 119 surrounded by an outer flange section 121, and comprising an alternate line of opening configuration formed in the concave face 123 thereof. Line of opening 122 is generally C-shaped, and as illustrated, comprising three opening control features: an opening initiation feature 124, and two anti-fragmentation features 126, 128. Opening initiation feature 124 is interconnected with anti-fragmentation feature 126 by line-of-opening segment 130, and anti-fragmentation feature 128 by line-of-opening segment 132. Anti-fragmentation features 126, 128 each comprise a respective end region 134, 136 which cooperatively define a hinge region 138 located there between. It is understood that the various opening control features depicted in FIG. 18 need not be used together or as a part of the line of opening configuration as illustrated. These features may be used alone or in any number of combinations, or may form a part of alternate line of opening configurations.

Figure 19:
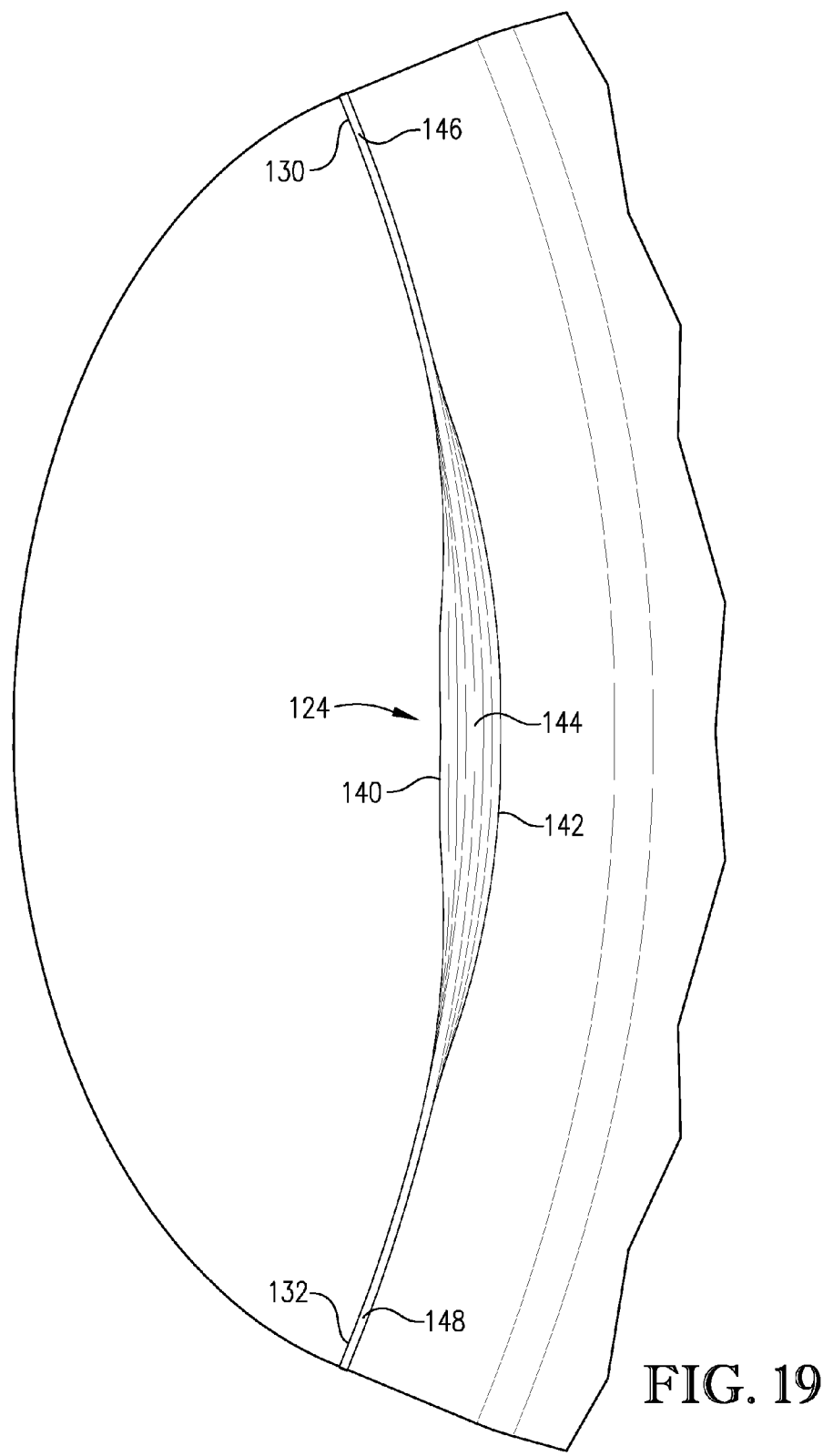
FIG. 19 is a close-up, fragmentary view of the opening initiation feature of the rupture disc of FIG. 18.

As shown in FIG. 19, opening initiation feature 124 is generally defined by a pair of lased side margins 140, 142 and comprises a lased opening-initiation area 144 located there between. The lased side margins 140, 142 are configured so as to converge toward each other in the direction away from the center of area 144 toward line-of-opening segments 130, 132. As with other embodiments described above, line-of opening segments 130, 132 comprise respective channels 146, 148 that penetrate concave face 123 toward the opposite convex face of bulged section 119. As illustrated, opening initiation feature 124 is continuous with line-of-opening segments 130, 132 with side margins 140, 142 eventually defining the boundaries of channels 146, 148. However, as can be appreciated, it is within the scope of the present invention for feature 124 and segments 130, 132 to be discontinuous, separated by one or more unlased areas.

Opening initiation feature 124 is generally formed in a manner similar to the formation of opening control feature 20 described above. However, the laser paths are configured and spaced so that at least some portion of each trench formed by the operation of a laser along a predetermined laser path overlaps at least some portion of another, adjacent trench. Thus, the creation of unlased segments 116, 118 (see, e.g., FIG. 17) is avoided and the energy emitted by the laser during processing of disc 120 is delivered across a wider area than embodiments in which there is a greater degree of trench overlap. The result is that lased opening-initiation area 144 has a more shallow depth than either of channels 146, 148. As segments 130, 132 are approached, the degree of trench overlap gradually increases until the full depths of channels 146, 148 are reached.

Figure 20:
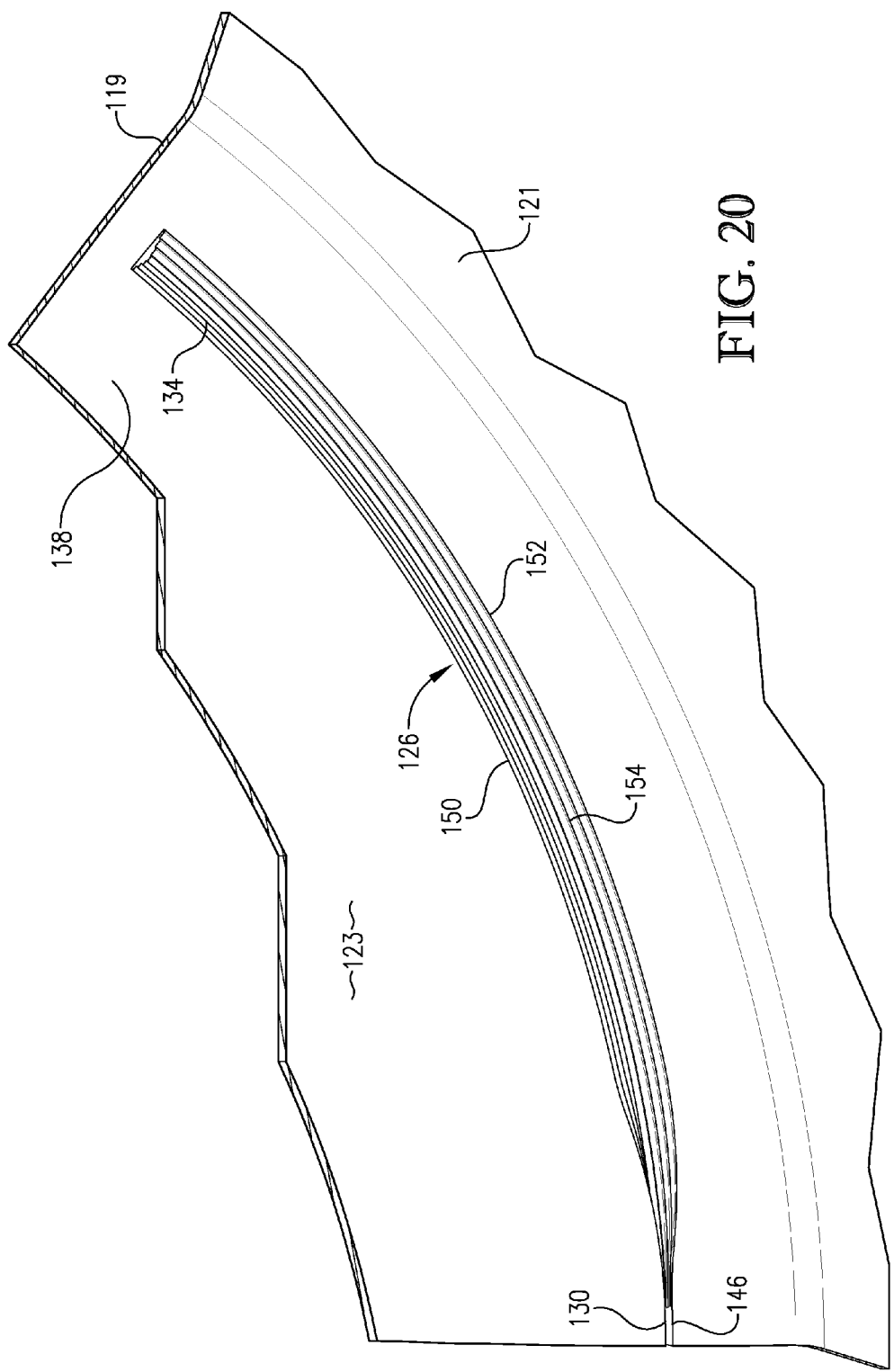
FIG. 20 is a close-up, sectioned view of the anti-fragmentation feature of the rupture disc of FIG. 18.

Turning to FIG. 20, anti-fragmentation feature 126 is shown in greater detail. Anti-fragmentation feature 126 is similar to opening initiation feature 124 in many respects. Particularly, feature 126 is generally defined by a pair of lased side margins 150, 152 that converge toward each other in the direction of line of opening segment 130. However, as side margins 150, 152 approach end region 134, the spacing between the side margins remains substantially constant. Feature 126 also comprises a lased anti-fragmentation area 154 located between side margins 150, 152. As with opening initiation feature 124, anti-fragmentation feature 126 is formed by varying the degree of overlap between trenches formed by successive laser beam passes. As end region 134 is approached, the degree of overlap between adjacent trenches is lessened so that the energy emitted by the laser is delivered across a wider area thereby resulting in area 154 being of more shallow depth than channel 146. Thus, as disc 120 opens and tears along line of opening 122, a thickened region of disc material is encountered at anti-fragmentation feature 126, the tearing of which absorbs greater energy until the tearing ceases, preferably in the vicinity of end region 134.

Figures 21, 22:
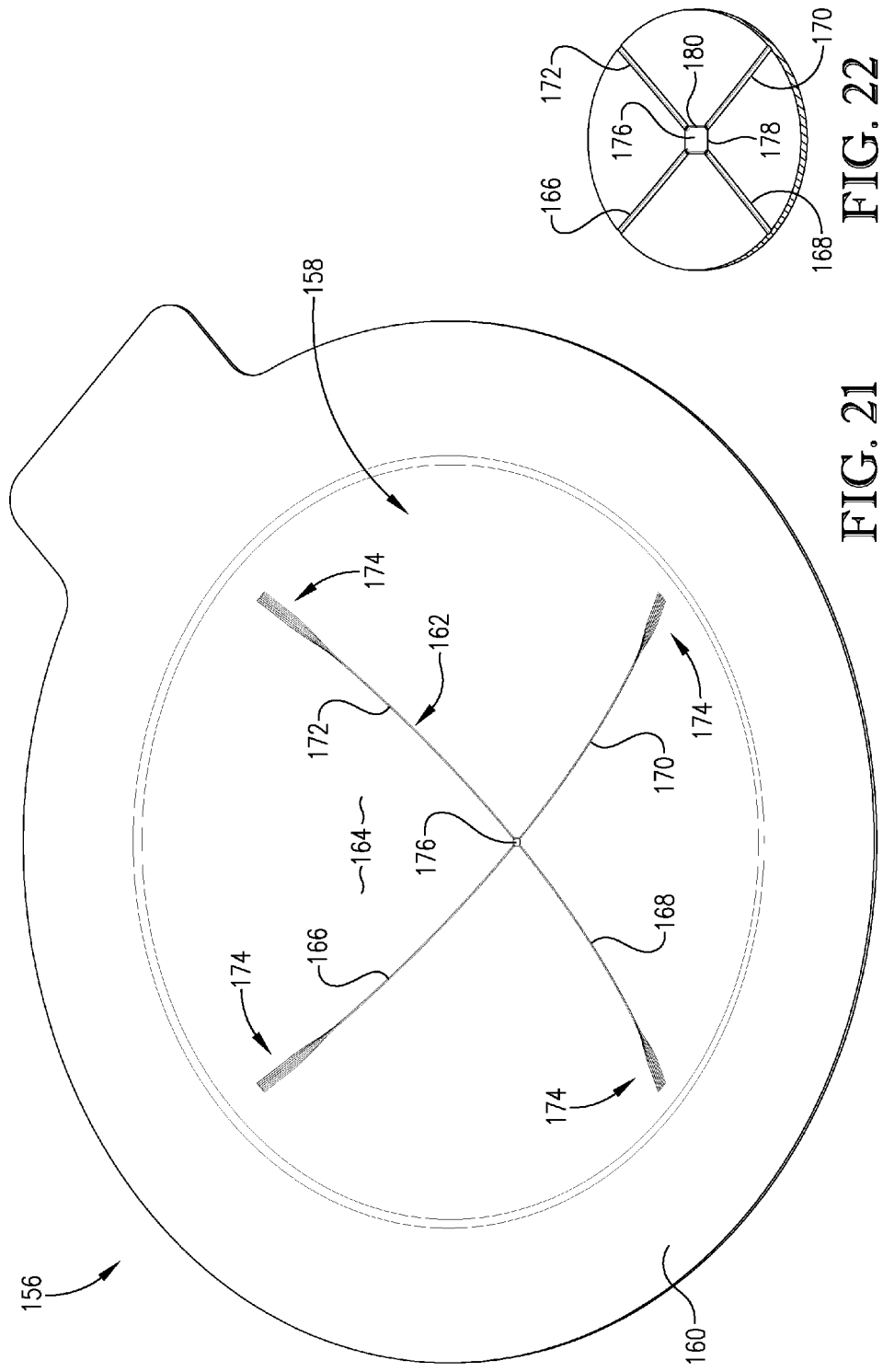
FIG. 21 is an isometric view of another rupture disc embodiment having a cross-patterned line of opening with anti-fragmentation features disposed at the end regions of the line-of-opening segments.
FIG. 22 is a close-up fragmentary view of a polygonal recessed area located at the apex of the disc's bulged section.

FIGS. 21 and 23 illustrate further exemplary embodiments of rupture discs that form a plurality of petals upon opening. Turning first to FIG. 21, rupture disc 156 comprises a bulged section 158 surrounded by an annular flange section 160. A line of opening 162 is formed in the concave face 164 of disc 156. Line of opening 162 is configured as a cross pattern and comprises line-of-opening segments 166, 168, 170, and 172 and a plurality of anti-fragmentation features 174 extending from the outboard end of each line-of-opening segment. The anti-fragmentation features 174 are configured similarly to anti-fragmentation features 126 discussed above.

As more clearly shown in FIG. 22, each line-of-opening segment extends inwardly toward a central section 176 of bulged section 158. Central section 176 generally comprises a lased area having a reduced thickness as compared with the immediately surrounding portion of bulged section 158. As illustrated, central section 176 is polygonal in shape, specifically octagonal, having four long sides 178 interconnected with four short sides 180. It is noted that line-of-opening segments 166-172 do not intersect with central section 178, but these features are separated by a narrow, unlased area. As with the rupture disc embodiment of FIG. 11, this configuration avoids pinholing concerns that might arise if the laser were to be doubly passed over one area of the disc. However, it is within the scope of the present invention for line-of-opening segments 166-172 to be interconnected and continuous with central section 176 depending upon the configuration of the laser paths used during laser processing of the disc.

FIG. 23 illustrates another embodiment of the present invention that is similar to that of FIG. 21, except that a slightly different line-of-opening configuration is employed. Specifically, a rupture disc 182 is shown having a bulged section 184 surrounded by an annular flange section 186. A line of opening 188 is formed in the concave face 190 of bulged section 184 and is configured such that upon rupture, five petals are formed. Line of opening 188 comprises line-of-opening segments 192, 194, 196, 198, 200 and an anti-fragmentation feature 202 that extends from the outboard end of each segment toward flange section 186. Anti-fragmentation features 202 are configured similarly to anti-fragmentation features 174 from the embodiment of FIG. 21. Central section 204 is configured differently than its counterpart in the embodiment of FIG. 21. As shown in FIG. 24, central section 204 comprises a decagon having five long sides 206 interconnected with five short sides 208. In all other respects, disc 182 is essentially the same as disc 156 from FIG. 21.

Figure 25:
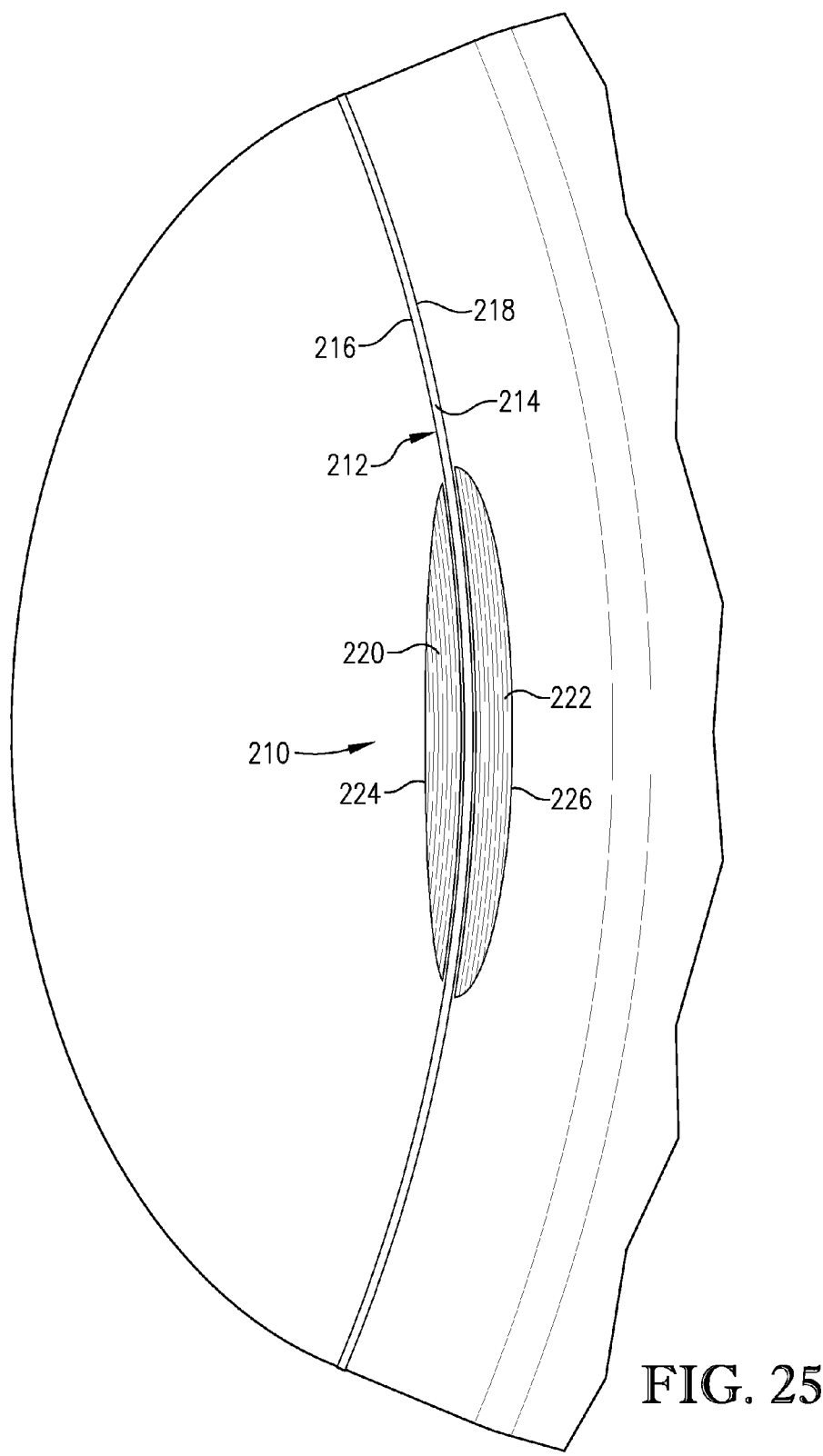
FIG. 25 is a close-up fragmentary view of an opening initiation feature made in accordance with another embodiment of the present invention.

FIG. 25 illustrates another possible opening initiation feature 210 configuration according to the present invention. Opening initiation feature 210 is similar in many conceptual respects to opening initiation feature 124 from FIG. 19. However, feature 210 possesses certain unique characteristics attributable primarily to the laser machining procedure by which it is created. It is noted that in certain embodiments, it is preferable for feature 210 to form a part of a C-shaped line of opening and to be positioned on the central section of the disc opposite from the hinge region of the disc. However, this need not always be the case. In one embodiment, a line of opening segment 212 is formed comprising a channel 214. As explained previously, channel 214 may be formed by passing a laser over the disc in a plurality of passes along tightly spaced laser paths, thereby forming a channel 214. Channel 214 is defined by a pair of channel margins 216, 218. The maximum width between margins 216, 218 is hereby expressed as $W_C$. Channel 214 also comprises a maximum depth, hereby expressed as $D_C$. In certain embodiments, the depth of channel 214 is relatively constant. However, it is within the scope of the present invention for the depth of channel 214 to be variable along its length. In any event, at some point along its length, channel 214 presents a maximum depth in which the thickness of remaining disc material at that point is minimized.

Opening initiation feature 210 may then be formed by passing a laser beam across the face of the disc in a plurality of passes along a plurality of laser paths. However, the laser paths coinciding with opening initiation feature 210 are spaced further apart than the laser paths used in the creation of line-of-opening segment 212. Therefore, the trenches created during manufacture of feature 210 are less superposed, and the resulting pockets 220, 222, which are located adjacent to line-of-opening segment 212, are generally going to be less deep on average than $D_C$. The average depth of pockets 220, 222 is hereby defined as $D_P$. Moreover, based on number of trenches and degree of trench superposition, pockets 220, 222 may present a maximum width, $W_P$, that may be defined as the maximum width of feature 210 (i.e., the maximum distance between feature side margins 224, 226) that is greater than $W_C$.

It is noted that like margins 140, 142 of opening initiation feature 124, margins 224, 226 converge toward each other in a direction toward line-of-opening segment 212. However, in contrast with the embodiment of FIG. 19, the laser paths from which feature 210 is created are generally concentric with line-of-opening segment 212 across their entire lengths. In the embodiment of FIG. 19, the laser paths tend to "feather out" away from line-of-opening segments 130, 132.

Figure 26:
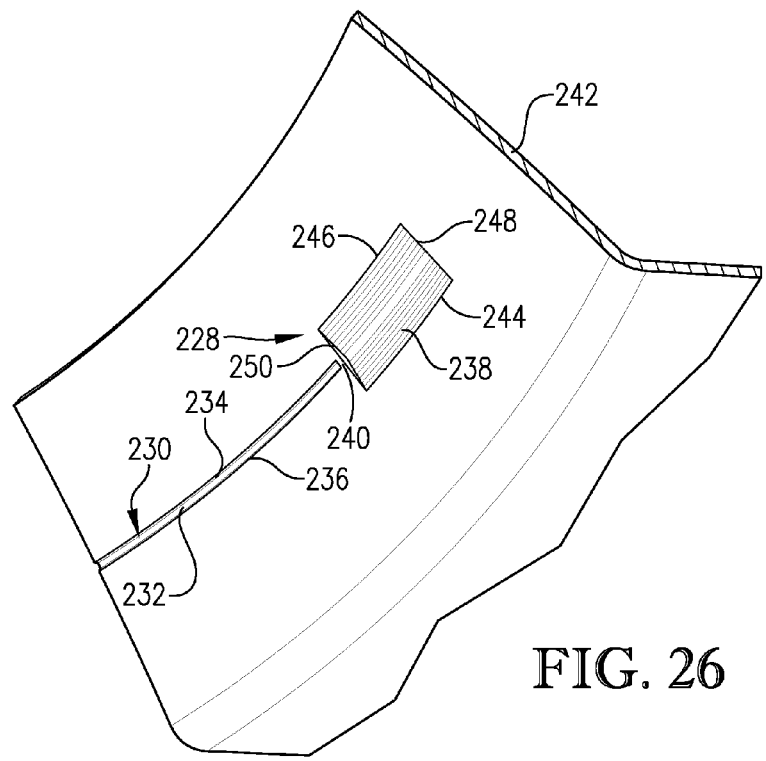
FIGS. 26 and 27 are close-up, sectioned views of alternate anti-fragmentation feature embodiments made in accordance with the present invention.
Figure 27:
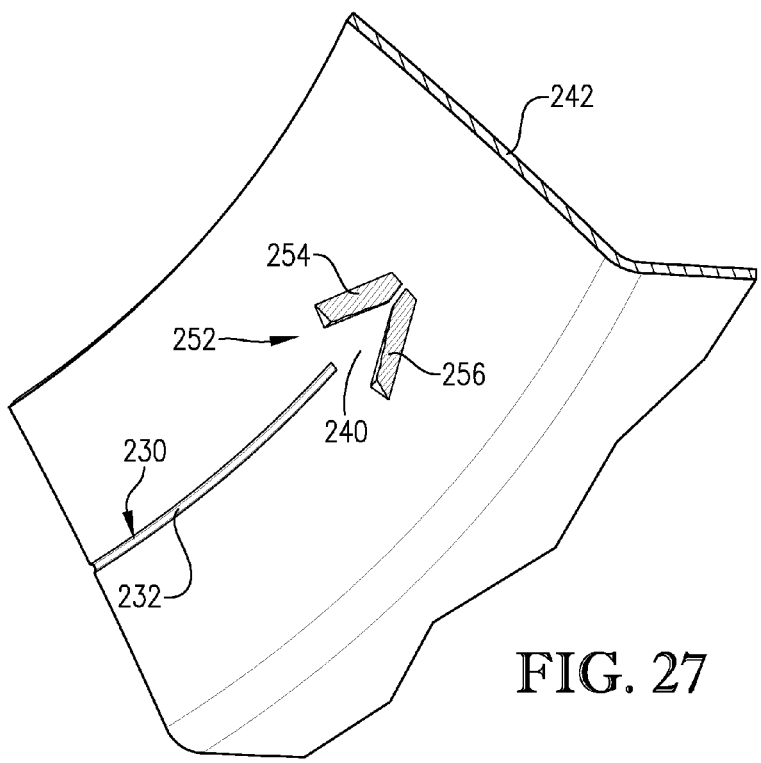

Turning now to FIGS. 26 and 27, alternate embodiments of anti-fragmentation features according to the present invention are illustrated. In FIG. 26, an anti-fragmentation feature 228 is shown adjacent to a line-of-opening segment 230. As with the other embodiments described above, line-of-opening segment 230 comprises a channel 232 that penetrates into the disc from one of the faces towards the other face. Channel 232 is defined by a pair of channel margins 234, 236 having a maximum width therebetween, $W_C$, and a maximum depth $D_C$. Anti-fragmentation feature 228 comprises a lased pocket 238 that is separated from line-of-opening segment 230 by an un-lased region 240 of the disc's central section 242, although it is within the scope of the present invention for the pocket to be contiguous with the line-of-opening segment. Pocket 238 generally takes the form of a rectangle (although any polygonal or non-polygonal configuration is possible) and defined by side margins 244, 246, which define the feature's length, and side margins 248, 250, which define the feature's width, $W_P$. As used herein, the term "length" refers to the largest dimension of the feature, and the term "width" refers to the next largest dimension of the feature (which may less than or equal to the length) in a direction generally perpendicular to the length. As with the anti-fragmentation and opening initiation features discussed above, anti-fragmentation feature 228 is generally formed by spacing the laser paths sufficiently apart so as to reduce the degree of trench superposition thereby leading to trenches of reduced depth, relative to channel 232. Thus, feature 228 presents an average depth, $D_P$, that is less than $D_C$. In certain embodiments, the maximum $W_P$ for feature 228 is also greater than $W_C$.

FIG. 27 illustrates yet another anti-fragmentation feature embodiment. Feature 252 possesses a number of similar characteristics as feature 228. However, feature 252 comprises a pair of pockets 254, 256 that are separated from each other and from line-of-opening segment 230 by un-lased region 240. In this embodiment, or any other embodiment in which anti-fragmentation feature comprises a plurality of pockets, the value for $W_P$ may be calculated as the sum of the lased pocket widths taken in a direction that is substantially perpendicular to the length of the feature.

Figure 28:
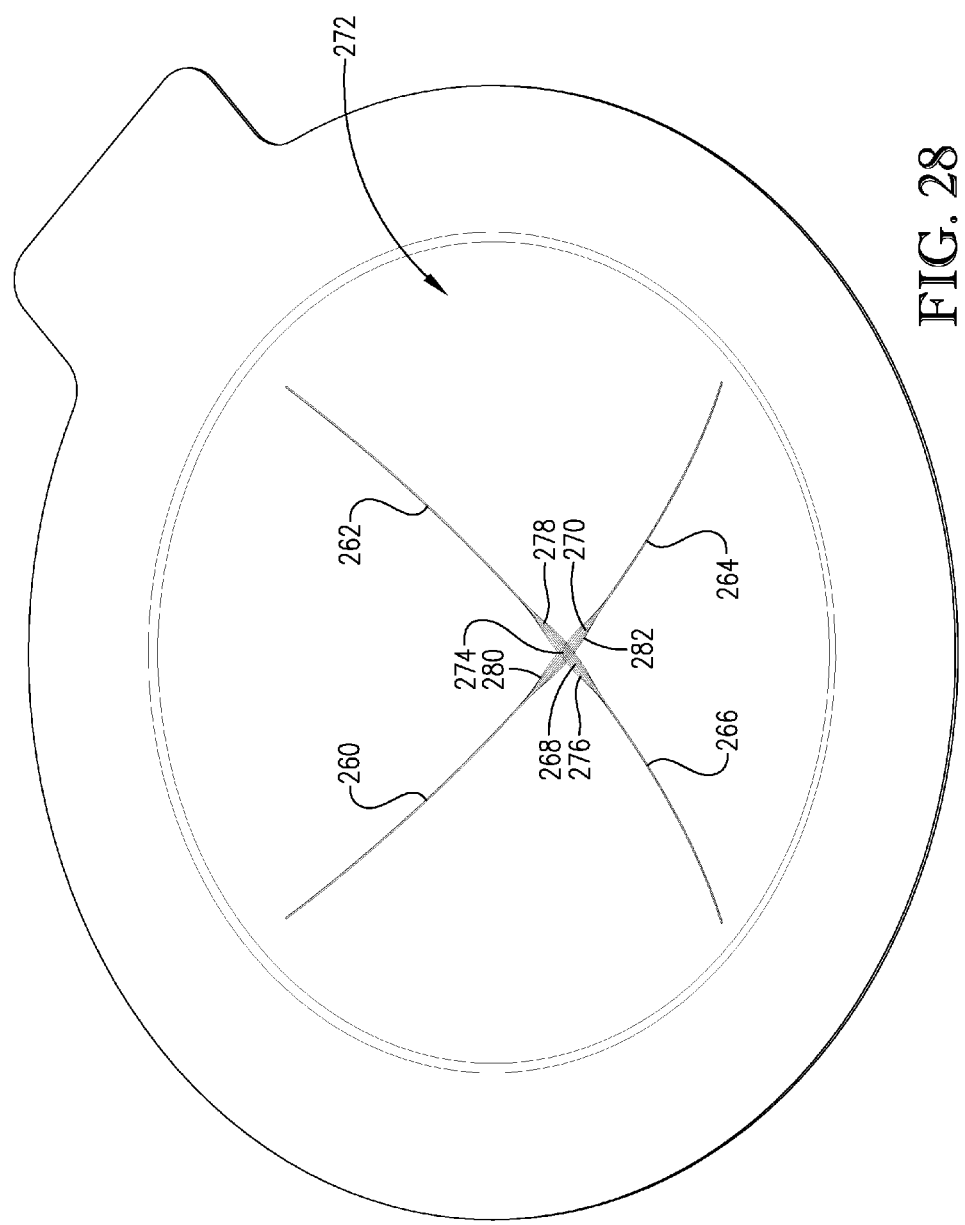
FIG. 28 is an isometric view of another rupture disc embodiment having an a cross-pattern line of opening including an opening initiation feature located at the center of the central section of the disc.

FIG. 28 illustrates an alternate line of opening configuration that is particularly suited for use on discs intended to produce a plurality of petals upon opening. Particularly, in these embodiments, the line of opening comprises a plurality of line-of-opening segments 260, 262, 264, 266. In certain embodiments, and as shown, the line-of-opening segments are generally arranged in pairs that are interconnected by a respective opening initiation feature 268, 270. For example, segments 260, 264 form a first pair of segments that are interconnected by a first opening initiation feature 270; and segments 262, 266 form a second pair of segments that are interconnected by a second opening initiation feature 268. It is within the scope of the present invention for the line of opening to comprise additional segment pairs and opening initiation features depending upon the number of petals desired upon opening of the disc. Opening initiation features 268, 270 intersect each other at or near the center of bulged section 272 to form a central pocket 274.

Opening initiation features 268, 270 can be created or configured as any of the opening control features (including both opening initiation and anti-fragmentation features) discussed above. However, in the embodiment illustrated in FIG. 28, opening initiation feature 268, 270 are similar to opening initiation feature 124 of FIG. 19 in that they represent a gradual decrease in degree of trench superposition moving away from their respective line-of-opening segments. Accordingly, features 268, 270 are defined at least in part by a pair of lased side margins 276, 278 and 280, 282, respectively. The side margins generally converge toward each other in the direction of the line-of-opening segments which they interconnect. As with the other embodiments discussed previously, each of the line-of-opening segments comprise a channel that penetrates into the disc from one face toward the other face.

Figure 29:
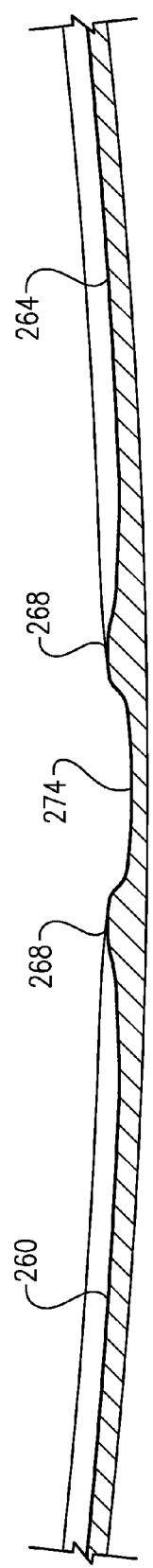
FIG. 29 is a sliced view of the central portion the rupture disc of FIG. 28 along one of the line of opening segments.

Manufacture of the line of opening can be carried out in a manner similar to the manufacture of line of opening 122 discussed above. Central pocket 274 represents an area of central section 272 where there is a greater degree of laser path superposition than the other portions of opening initiation features 268, 270. Accordingly, more disc material has been removed from central pocket 274 at any given point than has been for the other portions of features 268, 270 resulting in increased depth for pocket 274. The topography of the resulting structure is depicted in FIG. 29.

The upper surface of the net material at line-of-opening segments 260, 264 represents the floor of the channels from which these segments are comprised. In the transition from segment 260 to feature 268, net material thickness gradually increases as a result of the decrease in trench superposition. Material thickness then decreases as central pocket 274 is approached, as this portion of bulged section 272 has received additional ablative energy from the laser as compared to the other parts of feature 268 due to superposition of the crossing laser paths. Material thickness increases moving away from pocket 274 toward the opposite portion of feature 268. Finally, during the transition to line-of-opening segment 264, material thickness again decreases indicating an increase in trench superposition until full channel depth is achieved.

I claim:

1. An over-pressure relief device comprising:
    a rupture disc including a central section having opposed faces, and an outer flange section in surrounding relationship to said central section,
    a lased line of opening formed in said rupture disc, which defines, at least in part, an over-pressure relief area of said rupture disc,
    said lased line of opening including one or more line-of-opening segments and one or more lased opening control features, said one or more line-of-opening segments comprising a channel penetrating into the disc from one of said faces toward the other of said faces, said one or more opening control features defined at least in part by a pair of lased side margins, said pair of lased side margins converging toward each other in the direction of at least one of said line-of-opening segments.

2. The over-pressure relief device according to claim 1, wherein said central section is bulged and said opposed faces comprise a convex face and a concave face.

3. The over-pressure relief device according to claim 2, wherein said lased line of opening is formed in said concave face of said central section.

4. The over-pressure relief device according to claim 1, wherein said one or more opening control features comprises an opening-initiation feature configured to assist with opening of said rupture disc upon exposure to an overpressure condition.

5. The over-pressure relief device according to claim 4, wherein said lased line of opening is substantially C-shaped and comprises a pair of spaced-apart terminal end regions, said terminal end regions defining a hinge section therebetween.

6. The over-pressure relief device according to claim 5, wherein said opening-initiation feature, upon exposure of said rupture disc to an overpressure condition, is configured to engage a tooth located on a disc support ring placed adjacent to said rupture disc.

7. The over-pressure relief device according to claim 5, wherein said opening-initiation feature is located on said central section opposite from said hinge section.

8. The over-pressure relief device according to claim 1, wherein said one or more lased opening control features comprise a plurality of spaced-apart lased trenches, at least two of said trenches comprising said pair of lased side margins.

9. The over-pressure relief device according to claim 8, wherein said opening control feature comprises an opening-initiation feature, and wherein at least one of said lased trenches comprising said opening-initiation feature is discontinuous and comprises a pair of end sections interconnected by an un-lased region of said central section.

10. The over-pressure relief device according to claim 9, wherein at least one of said lased trenches comprises a bight section having curvature that extends in the direction of the center of said central section.

11. The over-pressure relief device according to claim 8, wherein said rupture disc is a reverse-acting rupture disc, and wherein said central section comprises a reversal initiation feature.

12. The over-pressure relief device according to claim 11, wherein said opening control feature comprises an opening-initiation feature, and wherein said central section further includes a line of weakness extending away from said reversal initiation feature and toward said opening-initiation feature.

13. The over-pressure relief device according to claim 8, wherein said one or more opening control features comprises an anti-fragmentation feature configured to diffuse the energy acting upon said rupture disc at said line of opening during opening of said rupture disc.

14. The over-pressure relief device according to claim 13, wherein at least one of said spaced-apart lased trenches extends from said channel in a direction that is toward said outer flange section.

15. The over-pressure relief device according to claim 13, wherein at least one of said spaced-apart lased trenches extends from said channel in a direction that is inboard of said line of opening.

16. The over-pressure relief device according to claim 8, wherein said spaced-apart trenches each have an average depth that is less than the average depth of said channel.

17. The over-pressure relief device according to claim 1, wherein said lased line of opening comprises a plurality of line-of-opening segments arranged in a crossing pattern on one face of said central section.

18. The over-pressure relief device according to claim 17, wherein at least one of said line-of-opening segments extends from an area of said central section adjacent said outer flange section toward the center of said central section but does not intersect any other of said line-of-opening segments.

19. The over-pressure relief device according to claim 17, wherein at least one of said plurality of line-of-opening segments comprises an end region located adjacent to said outer flange section, said end region comprising one of said opening control features, said end region opening control feature being an anti-fragmentation feature.

20. A method of forming a line of opening in a pressure relief device comprising:
providing a pressure relief device comprising a central section having opposed faces and an outer flange section in surrounding relationship to said central section; and
forming said line of opening in said pressure relief device by passing a laser beam over said pressure relief device in a plurality of laser passes, each of said passes following a predetermined laser path and being operable to selectively remove material from said pressure relief device by laser ablation thereby forming a trench, said line of opening comprising one or more line-of-opening segments and one or more opening control features, at least a portion of each of the plurality of said laser paths is spaced from at least a portion of another laser path such that the trench produced by laser ablation on each path is at least partially superposed on the trench produced by laser ablation on another laser path, said portions where the plurality of laser paths maintains a substantially constant separation and degree of trench superposition corresponding with said one or more line-of-opening segments,
at least a portion of each laser path diverges from one or more other laser paths, said portions of diverging laser paths corresponding with said one or more opening control features.

21. The method according to claim 20, wherein said central section is bulged and said opposed faces comprise a convex face and a concave face, said line of opening being formed in said concave face of said central section.

22. The method according to claim 20, wherein said one or more opening control features comprise a plurality of spaced-apart lased trenches, said lased trenches converging towards each other and merging into at least one of said line-of-opening segments, said one or more line-of-opening segments comprising a channel penetrating into the pressure relief device from one of said faces toward the other of said faces.

23. The method according to claim 22, wherein said one or more opening control features comprises an opening-initiation feature configured to assist with opening of said pressure relief device upon exposure to an overpressure condition.

24. The method according to claim 23, wherein said lased line of opening is substantially C-shaped and comprises a pair of spaced-apart terminal end regions, said terminal end regions defining a hinge section therebetween.

25. The method according to claim 24, wherein said opening-initiation feature is located on said central section opposite from said hinge section.

26. The method according to claim 22, wherein said one or more opening control features comprise an anti-fragmentation feature configured to diffuse the energy acting upon said pressure relief device at said line of opening during opening of said pressure relief device.

27. The method according to claim 26, wherein at least one of said spaced-apart lased trenches extends from said channel in a direction that is toward said outer flange section.

28. The method according to claim 26, wherein at least one of said spaced-apart lased trenches extends from said channel in a direction that is inboard of said line of opening.

29. The method according to claim 22, wherein during at least one of said laser beam passes, said laser beam is operated discontinuously in that portion of the laser path corresponding with at least one of said opening control features thereby resulting in the formation of a discontinuous trench comprising a pair of end sections interconnected by an un-lased region of said central section.

30. The method according to claim 22, wherein said spaced-apart trenches each have an average depth that is less than the average depth of said channel.

31. The method according to claim 20, wherein said lased line of opening comprises a plurality of line-of-opening segments arranged in a crossing pattern on one face of said central section.

32. The method according to claim 31, wherein at least one of said line-of-opening segments extends from an area of said central section adjacent said outer flange section toward the center of said central section but does not intersect at least one other of said line-of-opening segments.

33. The method according to claim 31, wherein at least one of said plurality of line-of-opening segments comprises an end region located adjacent to said outer flange section, said end region comprising one of said opening control features, said end region opening control feature being an anti-fragmentation feature.

34. An over-pressure relief device comprising:
a rupture disc including a central section having opposed faces, and an outer flange section in surrounding relationship to said central section;
a generally C-shaped lased line of opening formed in said rupture disc, which defines, at least in part, an over-pressure relief area of said rupture disc, said line of opening comprising a pair of spaced-apart end regions defining a hinge region therebetween about which a portion of said central section pivots upon opening of said disc, said lased line of opening including one or more line-of-opening segments and one or more lased opening control features, at least one of said opening control features comprising an opening-initiation feature, said opening-initiation feature being located on said rupture disc opposite from said hinge region, said one or more line-of-opening segments comprising a channel penetrating into the disc from one of said faces toward the other of said faces, said channel being defined by a pair of channel margins having a maximum width, $W_C$, therebetween and a maximum depth $D_C$, said opening-initiation feature comprising one or more pockets formed adjacent to one or more of said line-of-opening segments, at least one of said pockets having a having a maximum, width $W_P$ that is greater than $W_C$, and an average depth $D_P$ that is less than $D_C$.

35. The over-pressure relief device according to claim 34, wherein one of said line-of-opening segments intersects at least one of said pockets.

36. An over-pressure relief device comprising:

a rupture disc including a central section having opposed faces, and an outer flange section in surrounding relationship to said central section;

a lased line of opening formed in said rupture disc, which defines, at least in part, an over-pressure relief area of said rupture disc, said lased line of opening including one or more line-of-opening segments and one or more lased opening control features, at least one of said opening control features comprising an anti-fragmentation feature configured to diffuse the energy acting upon said rupture disc at said line of opening during opening of said rupture disc, said one or more line-of-opening segments comprising a channel penetrating into the disc from one of said faces toward the other of said faces, said channel being defined by a pair of channel margins having a maximum width, $W_C$, therebetween and a maximum depth $D_C$, said anti-fragmentation feature comprising one or more pockets positioned adjacent one of said line-of-opening segments, at least one of said pockets having a maximum, width, $W_P$, that is greater than $W_C$, and an average depth $D_P$ that is less than Dc.

37. An over-pressure relief device comprising:

a rupture disc including a central section having opposed faces, and an outer flange section in surrounding relationship to said central section;

a lased line of opening formed in said rupture disc comprising a first pair of line-of-opening segments interconnected by a first opening initiation feature and a second pair of line-of-opening segments interconnected by a second opening initiation feature, said first opening initiation feature intersecting with said second opening initiation feature at or near the center of said central section thereby forming a central pocket, each of said line-of-opening segments comprising a channel penetrating into the disc from one of said faces toward the other of said faces, each of said first and second opening initiation features being defined at least in part by a pair of lased side margins, said pair of lased side margins converging toward each other in the direction of said line-of-opening segments.

* * * * *